(12) United States Patent
Altenhofen et al.

(10) Patent No.: US 12,199,961 B2
(45) Date of Patent: *Jan. 14, 2025

(54) TECHNIQUES FOR SECURE BLOCKCHAIN MANAGEMENT

(71) Applicant: Visa International Service Association, San Francisco, CA (US)

(72) Inventors: Meredith Altenhofen, Denver, CO (US); Jason Blackhurst, San Francisco, CA (US); Quan Wang, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 447 days.

This patent is subject to a terminal disclaimer.

(21) Appl. No.: 17/540,056

(22) Filed: Dec. 1, 2021

(65) Prior Publication Data

US 2022/0094674 A1    Mar. 24, 2022

Related U.S. Application Data

(63) Continuation of application No. 16/348,709, filed as application No. PCT/US2017/013565 on Jan. 13, 2017, now Pat. No. 11,223,609.

(51) Int. Cl.
*H04L 29/06* (2006.01)
*G06F 16/23* (2019.01)
(Continued)

(52) U.S. Cl.
CPC ...... *H04L 63/0471* (2013.01); *G06F 16/2308* (2019.01); *H04L 9/3236* (2013.01);
(Continued)

(58) Field of Classification Search
CPC . H04L 63/0471; H04L 9/3236; H04L 9/3247; H04L 63/0442; H04L 63/061;
(Continued)

(56) References Cited

U.S. PATENT DOCUMENTS 5,262,942 A * 11/1993 Earle .................. G06Q 40/00
705/37
5,623,547 A *  4/1997 Jones ............... G06Q 20/40975
705/75

(Continued)

FOREIGN PATENT DOCUMENTS

CN        100501754 C  *  6/2009  ............. G06F 21/00
DE     102004063600 A1 *  7/2006  ............. G07B 15/02
(Continued)

OTHER PUBLICATIONS

Notice of Allowance, mailed Sep. 1, 2021, U.S. Appl. No. 16/348,709, 7 pages.

(Continued)

*Primary Examiner* — Sher A Khan
(74) *Attorney, Agent, or Firm* — Kilpatrick Townsend & Stockton LLP

(57) ABSTRACT

Embodiments of the invention are directed to a method for reducing a computational burden of a blockchain provider. A data processing computer may facilitate an exchange of a data transfer message between respective applications of a first and second device. The data processing computer may maintain an electronic record according to the exchange. A net transfer value may be determined for the record and data comprising the net transfer value may be transmitted to a blockchain provider. Receipt of the data by the blockchain provider may cause the blockchain provider to update a ledger with the net transfer value.

19 Claims, 7 Drawing Sheets

(51) Int. Cl.
    *H04L 9/32*                 (2006.01)
    *H04L 9/40*                 (2022.01)

(52) U.S. Cl.
    CPC ........ *H04L 9/3247* (2013.01); *H04L 63/0442* (2013.01); *H04L 63/061* (2013.01)

(58) Field of Classification Search
    CPC ....... H04L 9/50; H04L 63/12; H04L 2209/56; G06F 16/2308; G06Q 2220/00; G06Q 20/065; G06Q 20/0655; G06Q 20/10
    See application file for complete search history.

(56) References Cited

U.S. PATENT DOCUMENTS

| | | | |
|---|---|---|---|
| 6,971,007 | B1 | 11/2005 | Currans |
| 8,655,765 | B1 | 2/2014 | Gastineau et al. |
| 10,204,327 | B2 | 2/2019 | Katzin et al. |
| 11,223,609 | B2 | 1/2022 | Altenhofen et al. |
| 2002/0188527 | A1* | 12/2002 | Dillard ............... G06Q 30/0601 705/26.1 |
| 2004/0003241 | A1* | 1/2004 | Sengodan ............. H04L 9/3271 713/168 |
| 2005/0262010 | A1* | 11/2005 | Tull ....................... G06Q 40/00 705/37 |
| 2007/0041536 | A1* | 2/2007 | Koskinen ............. H04M 15/785 379/114.28 |
| 2011/0178884 | A1* | 7/2011 | Teicher .................. G06Q 20/02 705/16 |
| 2012/0323786 | A1* | 12/2012 | Kirsch ................... G06Q 40/02 705/44 |
| 2013/0046607 | A1 | 2/2013 | Granville, III |
| 2013/0061291 | A1* | 3/2013 | Hegg .................. H04L 63/0876 726/4 |
| 2014/0074724 | A1* | 3/2014 | Gordon .............. G06Q 20/3829 705/44 |
| 2014/0257047 | A1* | 9/2014 | Sillay ..................... H04L 63/10 600/595 |
| 2015/0019439 | A1* | 1/2015 | Phillips ................ G06Q 20/326 705/64 |
| 2015/0046241 | A1 | 2/2015 | Salmon et al. |
| 2015/0193744 | A1 | 7/2015 | Adleman |
| 2015/0269226 | A1* | 9/2015 | Veldhuizen ......... G06F 16/2315 707/625 |
| 2015/0363778 | A1* | 12/2015 | Ronca ................ G06Q 20/4016 705/71 |
| 2016/0098723 | A1 | 4/2016 | Feeney |
| 2016/0292680 | A1* | 10/2016 | Wilson, Jr. .......... H04L 63/0428 |
| 2016/0321751 | A1 | 11/2016 | Creighton, IV et al. |
| 2016/0358135 | A1 | 12/2016 | Liao et al. |
| 2016/0358164 | A1 | 12/2016 | Liao et al. |
| 2017/0005804 | A1 | 1/2017 | Zinder |
| 2017/0011460 | A1 | 1/2017 | Molinari et al. |
| 2017/0046693 | A1 | 2/2017 | Haldenby et al. |
| 2017/0076306 | A1* | 3/2017 | Snider ................ G06Q 30/0205 |
| 2017/0316415 | A1* | 11/2017 | Gonzalez ............. G06Q 20/409 |
| 2017/0317833 | A1* | 11/2017 | Smith .................. H04L 63/0442 |
| 2018/0109541 | A1* | 4/2018 | Gleichauf ............. H04W 12/06 |
| 2018/0115413 | A1* | 4/2018 | King ......................... H04L 9/30 |
| 2018/0137507 | A1* | 5/2018 | Jayachandran ...... G06Q 20/401 |
| 2018/0253702 | A1 | 9/2018 | Dowding |

FOREIGN PATENT DOCUMENTS

| | | | |
|---|---|---|---|
| KR | 1020160095720 | 8/2017 | |
| WO | WO-0104808 A1 * | 1/2001 | ............. G06Q 30/02 |
| WO | WO-2018115567 A1 * | 6/2018 | |

OTHER PUBLICATIONS

Office Action, mailed Sep. 12, 2023, EP Application No. EP20203854. 3, 5 pages.

U.S. Appl. No. 16/348,709, Non-Final Office Action, Mailed On Mar. 4, 2021, 21 pages.

Application No. EP17891112.9, Extended European Search Report, Mailed On Sep. 26, 2019, 10 pages.

Application No. EP17891112.9, Notice of Decision to Grant, Mailed On Nov. 5, 2020, 2 pages.

Application No. EP20203854.3, Extended European Search Report, Mailed On Feb. 22, 2021, 11 pages.

Franco, "Understanding Bitcoin: Cryptography, Engineering and Economics", Nov. 24, 2014, 187 pages.

McCorry et al., "Towards Bitcoin Payment Networks", Available online At: https://eprint.iacr.org/2016/408.pdf, Jan. 1, 2016, pp. 1-20.

Application No. PCT/US2017/013565, International Preliminary Report on Patentability, Mailed On Jul. 25, 2019, 10 pages.

Application No. PCT/US2017/013565, International Search Report and Written Opinion, Mailed On Oct. 20, 2017, 13 pages.

Poon et al., "The Bitcoin Lightning Network: Scalable Off Chain Instant Payments", Draft Version 0.5.9.2, Jan. 14, 2016, pp. 1-59.

* cited by examiner

TECHNIQUES FOR SECURE BLOCKCHAIN MANAGEMENT

CROSS REFERENCE TO RELATED APPLICATIONS

This application is a Continuation of U.S. patent application Ser. No. 16/348,709 filed May 9, 2019, which is a US national stage of PCT/US2017/013565, filed Jan. 13, 2017, both of which are incorporated herein by reference in their entirety.

BACKGROUND

Blockchain technology is becoming more common place. A "blockchain" can be a distributed database that maintains a continuously-growing list of records secured from tampering and revision. A blockchain may include a number of blocks of interaction records. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by a blockchain provider after it completes the block and the block is validated. A blockchain may be distributed, and a copy of the blockchain may be maintained at one or more locations. In some examples, the blockchain can be used to verify transactions. The security of a blockchain may be obtained using a cryptographic scheme.

While utilization of a blockchain can bring many benefits, current techniques require each interaction record to be reported to the blockchain. Given the growing popularity of blockchain technology, it may prove difficult to manage and track each and every interaction between each and every connected device within a system. Accordingly, current techniques include inherent latency issues.

Embodiments of the invention address these and other problems, individually and collectively.

SUMMARY

Embodiments of the invention are directed to techniques for secure blockchain management.

One embodiment of the invention is directed to a method. The method comprises facilitating, by a data processing computer, an exchange of a plurality of data transfer messages between a first application of a first electronic device and a second application of a second electronic device. In at least one embodiment, each of the plurality of data transfer messages are digitally signed. The method further comprises maintaining, by the data processing computer, an electronic record associated with a first user of the first electronic device and a second user of the second electronic device according to the exchange. The method further comprises determining, by data processing computer, a transfer value for the electronic record. The method further comprises transmitting, by data processing computer, data comprising the transfer value to a block chain provider. In at least one embodiment, receipt of the data by the blockchain provider may cause the blockchain provider to update a ledger with the transfer value.

Another embodiment of the invention is directed to a data processing computer configured to perform the above-described method.

Another embodiment of the invention is directed to a method comprising maintaining, by a computing device, a first record and a second record, the first record being associated with a first trust relationship between a first electronic device and a second electronic device, the second record being associated with a second trust relationship between the second electronic device and a third electronic device. The method further comprises receiving, by the computing device from a first application of the first electronic device, a request to conduct a data transfer associated with the first electronic device and the third electronic device. The method further comprises transmitting, by the computing device on behalf of the first electronic device, a first data transfer message to a second application of the second electronic device. The method further comprises transmitting, by the computing device on behalf of the second electronic device, a second data transfer message to a third application of the third electronic device. The method further comprises updating, by the computing device, a first record associated with the first electronic device and the second electronic device according to the first data transfer message. The method further comprises updating, by the computing device, a second record associated with the second electronic device and the third electronic device according to the second data transfer message. The method further comprises determining, by the computing device, transfer values for the first record and the second record. The method further comprises transmitting, by the computing device, data comprising the transfer values to a block chain provider, wherein receipt of the data by the block chain provider causes the block chain provider to update a ledger with the transfer values of the first record and the second record.

Further details regarding embodiments of the invention can be found in the Detailed Description and the Figures.

DETAILED DESCRIPTION

Figure 1:
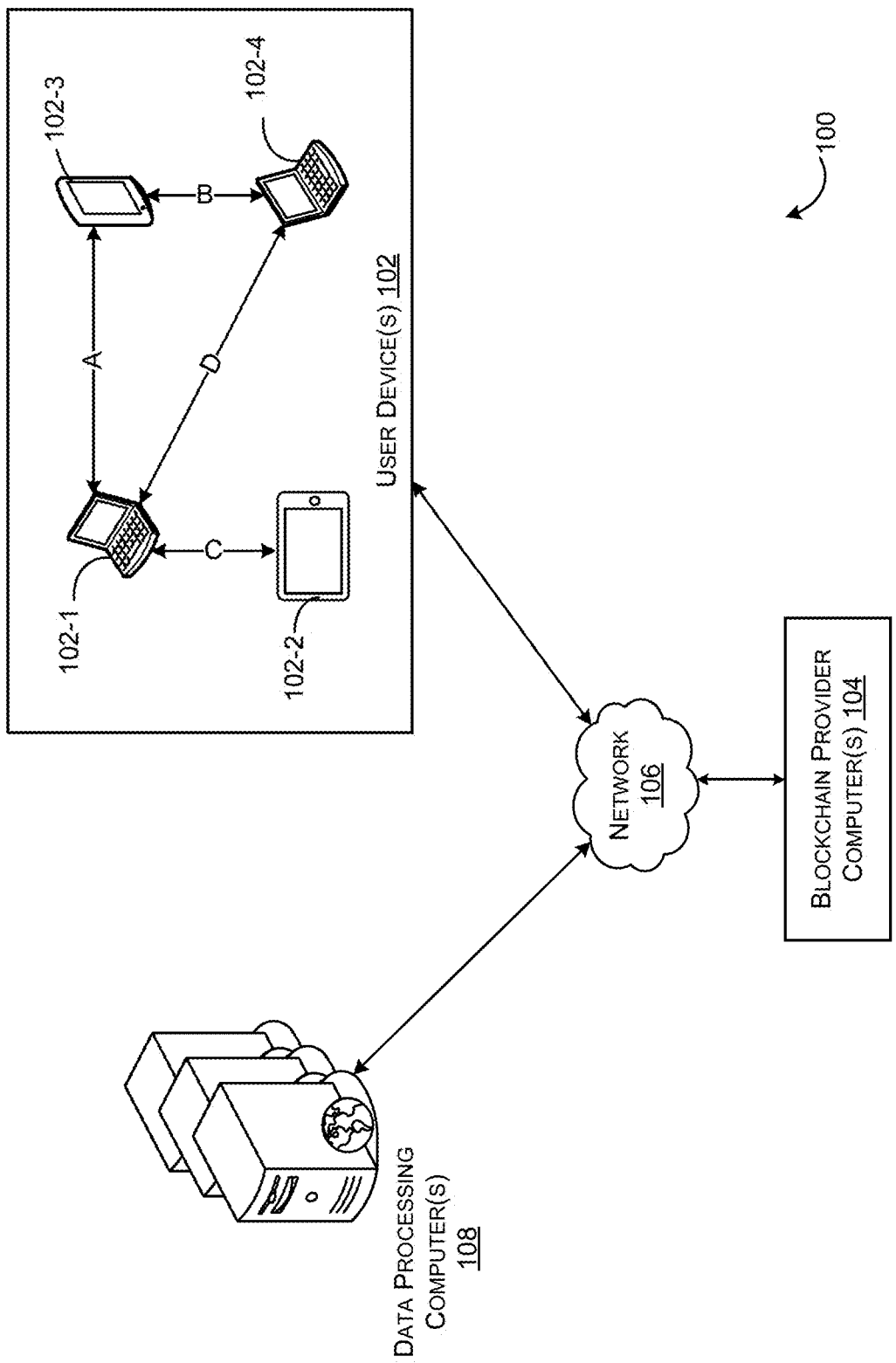
FIG. 1 shows a block diagram of a system for managing a blockchain, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "user device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both electronic devices taken together may be considered a single user device).

A "credential" may be any suitable information that serves as reliable evidence of worth, ownership, identity, or authority. A credential may be a string of numbers, letters, or any other suitable characters that may be present or contained in any object or document that can serve as confirmation.

An "application" may be computer code or other data stored on a computer readable medium (e.g. memory element or secure element) that may be executable by a processor to complete a task.

A "token" may define a threshold limit to be applied to a transfer channel. The threshold limit defined by the token may be associated with a participant of the transfer channel. A token may define an amount associated with cybercurrency and/or fiat currency. In some embodiments, a token may be backed by an amount of fiat currency or the token may not be backed with fiat currency. In at least one embodiment, a token may be generated such that the amount associated with the token may become unspendable by a user (e.g., a blockchain user). For example, a blockchain provider may document in a ledger that the user has received a token and may reserve the amount corresponding to the token within the ledger such that the user cannot spend the reserved amount more than once.

A "token request message" may be an electronic message for requesting a token. A token request message may include information usable for identifying a payment account and/or information for generating a token. For example, a token request message may include payment credentials, user identification information (e.g. a name, alphanumeric identifier, a user device identifier, etc.), an amount associated with a requested token, a transfer channel limit (e.g., a threshold limit associated with the transfer channel and/or a user of the transfer channel), a cryptogram, and/or any other suitable information.

A "token response message" may be a message that responds to a token request. A token response message may include an indication that a token request was approved or denied. A token response message may also include a token (e.g., an amount and/or threshold limit), user identification information (e.g. a name, alphanumeric identifier, a user device identifier, etc.), a transfer channel limit (e.g., a threshold limit associated with the transfer channel and/or a user of the transfer channel), a cryptogram, and/or any other suitable information.

A "transfer channel request message" can be an electronic message utilized to request a transfer channel. In some embodiments, a transfer channel request message may include a channel initiator (e.g., a user identifier, a user device identifier, etc.) and any suitable number of channel participants (e.g., one or more other user identifiers, one or more other user device identifiers, etc.). In at least one example, the transfer channel request message may include a data field associated with a threshold limit for the transfer channel and/or a data field associated with a threshold limit associated with one or more users/user devices. In some embodiments, a transfer channel request message may be signed using a private key associated with the user/user device, such that it may be verified using a public key associated with the user/user device, as appropriate. A transfer channel request message may include a request type indicator. The request type indicator may indicate that the request is to open or the request is to close a data transfer channel. In at least one example, a transfer channel request message that indicates that a user is requesting to close a channel may be referred to as a "close channel request message." In at least one example, a transfer channel request message that indicates that a user is requesting to open a channel may be referred to as an "open channel request message."

A "transfer channel response message" can be an electronic message utilized to respond to a transfer channel request message. In some embodiments, a transfer channel response message may include a channel initiator (e.g., a user identifier, a user device identifier, etc.) and any suitable number of channel participants (e.g., one or more other user identifiers, one or more other user device identifiers, etc.). In at least one example, the transfer channel response message may include a data field associated with a threshold limit for the transfer channel, a data field associated with a threshold limit associated with one or more users/user devices, a token (e.g., an amount and/or a threshold limit) associated with the transfer channel and/or a user device, and/or a public/private key associated with the user/user device. In at least one embodiment, the transfer channel response message may indicate a response indicator that indicates whether channel creation was successful or unsuccessful. A transfer channel response message may include a request type indicator. The request type indicator may indicate that the response relates to request to open or the response relates to a request to close a data transfer channel. In at least one example, a transfer channel response message that indicates a response to a request to close a channel may be referred to as a "close channel response message." In at least one example, a transfer channel response message that indicates a response to a request to open a channel may be referred to as an "open channel response message."

As discussed above, a "blockchain" can be a distributed database that maintains a continuously-growing list of records secured from tampering and revision. A blockchain may include a number of blocks of interaction records. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a verification network. Any node within the verification network may subsequently use the blockchain to verify transactions. The security of a blockchain may be obtained using a cryptographic scheme.

A "blockchain provider computer" can be an electronic device configured to provide blockchain functionality. The blockchain provider computer can include a single device or multiple devices configured to maintain aspects of the blockchain (e.g., one or more ledgers, token management, etc.). In some examples, the blockchain provider computer may additionally provide token management functionality. Thus, in some embodiments, it is contemplated that blockchain and token management functionality may be commonly performed by a blockchain provider computer.

A "data transfer request message" can be an electronic message utilized to request a data transfer. In some examples, a data transfer request message may be initiated by a user device (e.g., a user device operated by an individual). The data transfer request message may indicate a recipient of the data transfer (e.g., another individual associated with a different user device). For example, another electronic device (e.g., a server, another electronic device operated by another individual/entity) and/or a user (e.g., an individual and/or entity) may be designated as the recipient of the data transfer request message. The data transfer request message may indicate a value associated with the data transfer. By way of example, the value may indicate a monetary amount, a digital asset amount, a number of points (e.g., reward points, a score, etc), or any suitable value/denomination of transferable data. In at least one example, the data transfer request message may include data fields including, but not limited to, an initiator identifier data field, a recipient identifier data field, a transfer value data field, a digital signature data field, a net transaction value, a timestamp data field, and the like. In at least one example, a data transfer request message may be initiated by a data processing computer. In some examples, the net transaction value may be in a format suitable for immediate recordation within a ledger managed by a blockchain provider computer. In some embodiments, a data transfer request message may be signed using a private key associated with the user/user device, such that it may be verified using a public key associated with the user/user device, as appropriate.

A "data transfer response message" can be an electronic message utilized to respond to a data transfer request message. In some examples, a data transfer response message may be initiated by a user device (e.g., an electronic device operated by an individual and/or an entity). The data transfer response message may indicate the initiator of a corresponding data transfer request message. For example, another user device (e.g., a server, another electronic device operated by another individual/entity) and/or a user (e.g., an individual and/or entity) may be designated as the initiator of the data transfer request message corresponding to the data transfer response message. The data transfer response message may indicate a value of the data transfer (e.g., a value received from a corresponding data transfer request message). By way of example, the value may indicate a monetary amount, a digital asset amount, a number of points (e.g., reward points, a score, etc), or any suitable value/denomination of transferable data. In at least one example, the data transfer response message may include data fields including, but not limited to, an initiator identifier data field, a recipient identifier data field, a transfer value data field, a digital signature data field, a timestamp data field, a response code, and the like. In at least one embodiment, the data transfer response message may be digitally signed with a private key of the sender, while in other embodiments a data request response message may not be digitally signed. In some examples, the response code may indicate whether or not the data transfer request has been approved or declined.

An "electronic record" may be any record of one or more transactions stored electronically. For example, an electronic record may comprise a number of interaction records associated with one or more identities (e.g., two or more users, two or more user devices, etc.). In some embodiments, an electronic record may be utilized to record each of the interaction records received and/or transmitted to/from two or more electronic devices. In some embodiments, an electronic record may be associated with one or more threshold limits. Each threshold limit may indicate a value that is not to be exceeded by data transactions initiated by a particular user and/or a transfer channel. For example, an electronic record associated with two users/electronic devices, may further be associated with two threshold limits. The first threshold limit may indicate a value that is not to be exceeded by data transactions initiated by the first user, while the second threshold limit may indicate a second value that is not to be exceeded by data transactions initiated by the second user. In at least one example, an electronic record may maintain an association between a public key and a user device and/or an association between a token (e.g., an amount and/or threshold limit) maintained by a blockchain provider and a user device.

A "cryptographic key" may be any string of bits used by a cryptographic algorithm to transform plain text into cipher text or vice versa. Cryptographic keys may include symmetric and asymmetric keys. A cryptographic key may be used to sign data transfer request/response messages. For example, a data transfer request/response message may be signed using a private key. The signed data transfer request/response message may then be verified using a public key that corresponds to the private key.

A "private key" is a type of cryptographic key that is kept secret by a party. A private key may be used to sign transactions such that they may be verified by another electronic device. For example, one or more data fields may be used to calculate a hash value. A private key may be utilized by a cryptographic algorithm to sign the hash value such that another electronic device may utilize a public key to verify the signature and the verified values may be compared to the unencrypted data transfer request/response message payload to determine validity and integrity of the data transfer request/response message.

A "public key" may be a type of cryptographic key that is distributed to, or available to, some entity over than a party holding a corresponding private key. A public key may be made available to electronic devices so that signed transactions associated with the public key may be verified by the electronic devices in a similar manner as discussed above.

An "authorization request message" may be an electronic message that requests authorization for a transaction. In some embodiments, it is sent to a payment processor network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "user" may include an individual and/or an entity. In some embodiments, a user may be associated with one or more personal accounts and/or electronic devices. The user may also be referred to as a cardholder, account holder, consumer, merchant, or the like.

A "data processing computer" may be operated by an entity that can provide data processing services. A data processing computer may provide functionality for processing interaction records and/or managing electronic records associated with one or more users/electronic devices. A data processing computer may be configured to transmit and receive messages (e.g., token request/response messages, data transfer request/response messages, etc.) from two or more electronic devices and/or to/from a blockchain provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a block diagram of a system 100 for managing a blockchain, according to some embodiments. The system 100 may comprise user device(s) 102 (e.g., user device 102-1, user device 102-2, user device 102-3, and user device 102-4). It should be appreciated that user device(s) 102 may comprise any suitable number of user devices. The system 100 may further include a blockchain provider computer(s) 104 and data processing computer(s) 108. Each of these systems and computers may be communicatively coupled with each other (e.g., via the network 106). For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The blockchain provider computer(s) 104 may have any suitable characteristics. The blockchain provider computer(s) 104 may individually include a processor and a computer readable medium coupled to the processor, the computer readable medium comprising code, executable by the processor for performing the functionality described herein. The blockchain provider computer(s) 104 may be communicatively coupled to the data processing computer(s) 108 (e.g., via network 106). In at least some embodiments, the blockchain provider computer(s) 104 may additionally be communicatively coupled to the user device(s) 102 (e.g., via the network 106).

In at least one embodiment, the blockchain provider computer(s) 104 may be configured to perform token management functions including the maintenance and/or enforcement of tokens (e.g., an amount and/or threshold limit associated with a user and/or channel). In at least one example, the blockchain provider computer(s) 104 may be configured to receive token request messages from the data processing computer(s) 108 and/or the user device(s) 102 and provide token response messages to the data processing computer(s) 108 and/or the user device(s) 102. In some embodiments, the blockchain provider computer(s) 104 may be configured to provision and maintain a mapping of a token (e.g., an amount and/or threshold limit) and a user/entity for which the token is associated.

In at least one embodiment, the blockchain provider computer(s) 104 may further be configured to receive data transfer request message(s) from the user device(s) 102, individually, and/or from the data processing computer(s) 108 (e.g., via the network 106). The blockchain provider computer(s) 104 may further be configured to perform functions including managing one or more ledgers according to received data transfer request messages and/or token request messages.

The user device(s) 102 may individually include a processor and a computer readable medium coupled to the processor, the computer readable medium comprising code, executable by the processor for performing the functionality described herein. The user device(s) 102 may be communicatively coupled to the data processing computer(s) 108 and/or the blockchain provider computer(s) 104 via a communications medium (e.g., the network 106) in order to exchange information (e.g., interaction records). The user device(s) 102 may individually include one or more software modules that comprise a software application (e.g., a data transfer application). The software application may be configured to manage information related to data transfers initiated and/or received by the user device(s) 102.

The data processing computer(s) 108 may be associated with any suitable data processing provider. The data processing computer(s) 108 may individually include a processor and a computer readable medium coupled to the processor, the computer readable medium comprising code, executable by the processor for performing the functionality described herein. Examples of data processing computer(s) 108 includes any device capable of communicating with the network 106 and initiating/processing information, including transfer channel request/response messages, token request/response messages, and/or data transfer request/response messages. The data processing computer(s) 108 may transmit and/or receive data through the communications medium (e.g., the network 106) to/from at least one of user device(s) 102 and/or the blockchain provider computer(s) 104. In at least one embodiment, the data processing computer(s) 108 may be configured to manage an electronic record associated with one or more users/user device(s) 102. The electronic record, in some cases, may include one or more interaction records associated with a data request/response message. In still further examples, the data processing computer(s) 108 may be configured to enforce one or more threshold limits associated with one or more users/user device(s) 102. In at least one embodiment, the data processing computer(s) 108 may be configured to generate and store public and/or private keys for at least one of the user device(s) 102. The data processing computer(s) 108 may utilize the stored public key associated with a user device to verify messages (e.g., a transfer channel request/response message, a data transfer request/response message) from the user device in order to validate a message initiated by the user device.

In at least one embodiment, the data processing computer(s) 108 may be configured to facilitate the exchange of transfer channel request/response messages and/or data transfer request/response messages between two or more of the user device(s) 102. For example, the data processing computer(s) 108 may be configured to act as an intermediary device to facilitate the exchange of transfer channel request/response messages and/or data transfer request/response messages via transfer channels A, B, C, and D as depicted in FIG. 1. In one non-limiting example, the user device 102-1 may submit a transfer channel request message (e.g., via an application operating on the user device 102-1) that requests a transfer channel be created. Upon receipt, or at another suitable time, the data processing computer(s) 108 may forward the transfer channel request message to the user device 102-3. A user of the user device 102-3 may indicate (e.g., utilizing an application operating on the user device 102-3) whether or not he wishes to allow the creation of a transfer channel (e.g., an electronic record) associated with the user device 102-1 and the user device 102-3. If the user of the user device 102-3 rejects the transfer channel request, the data processing computer(s) 108 may be configured to refrain from further processing. However, if the user of the user device 102-3 approves the transfer channel request, a transfer channel response message may be transmitted from the user device 102-3 to the data processing computer(s) 108. In at least one embodiment, the transfer channel request messages may be exchanged directly between the user device 102-1 and the user device 102-3. In these examples, the transfer channel response message may be transmitted by one, or both user devices, and received by the data processing computer(s) 108.

In at least one embodiment, upon receipt of a transfer channel response message that indicates that a transfer channel has been initiated and approved, the data processing computer(s) 108 may be configured to create an electronic record associated with the user device 102-1 and the user device 102-3. The process of creating the electronic record associated with the user device 102-1 and the user device 102-3 may be referred to as "opening a channel." In some examples, the data processing computer(s) 108 may additionally receive, via the transfer channel request message and/or the transfer channel response message, one or more threshold limits. Each threshold limit may be associated with the user device 102-1, the user device 102-3, or the electronic record.

In some examples, the data processing computer(s) 108 may be configured to request one or more tokens from the blockchain provider computer(s) 104 on behalf of the user device 102-1 and/or the user device 102-3. A token may be associated with an amount and/or threshold limit received from a transfer channel request message. In some examples, the data processing computer(s) 108 may wait until a token response message (e.g., indicating that the amount and/or threshold limit of the token has been recorded) is received for each of the devices associated with the transfer channel before opening a transfer channel (e.g., creating an electronic record associated with the user devices). In at least one embodiment, the received token response messages may individually include a token (e.g., and amount and/or a threshold limit) for which a user's data transfer amounts cannot exceed. In other examples, the received token(s) may individually represent a threshold limit for which a combined data transfer amount associated with a set of data transfers recorded within the electronic record cannot exceed.

After creating the electronic record associated with the user device 102-1 and the user device 102-3, the data processing computer(s) 108 may be configured to receive data transfer request messages from either/both the user device 102-1 and/or the user device 102-3. Upon receipt of each data transfer request message, the data processing computer(s) 108 may be configured to forward the data transfer request message to the other user device. Upon receiving a data transfer response message from the other device indicating that the data transfer request was approved, the data processing computer(s) 108 may be configured to record the data transfer as an interaction record within the electronic record associated with the user devices.

In at least one embodiment, at least one of the user device 102-1 or the user device 102-3 may initiate a transfer channel request message that indicates a desire to close the transfer channel associated with the user device 102-1 and the user device 102-3. In some cases, the data processing computer(s) 108 may be configured to maintain the transfer channel (e.g., the electronic record) until a transfer channel request message has been received from each recipient of data. By way of example, consider that a transfer channel was opened between the user device 102-1 and the user device 102-3, but only the user device 102-1 received any data corresponding one or more data transfer request messages initiated by the user device 102-3. In this example, the transfer channel may be closed (e.g., the electronic record may be deleted) upon receipt of a transfer channel request message from the user device 102-1 requesting that the transfer channel be closed. If both devices were to receive data from the other device, then in some examples, a transfer channel request message requesting that the transfer channel be closed would be required from both user devices before the transfer channel would actually be closed (e.g., the electronic record deleted).

In at least one example, the data processing computer(s) 108, upon closing a channel, or at another suitable time, may be configured to determine a net transfer amount indicating a one-way transfer of data between the user device 102-1 and the user device 102-3. For example, in some cases the user devices may be exchanging cybercurrency and/or fiat currency. Upon closing the channel, the data processing computer(s) 108 may be configured to determine a net transfer amount to be exchanged. The data processing computer(s) 108, in some embodiments, may provide the net transfer amount to the blockchain provider computer(s) 104 in a single message (e.g., a data transfer request message). In some examples, the data processing computer(s) 108 may be configured to provide the net transfer amount via the data transfer request message in a format suitable for immediate recordation in the ledger. Upon receipt of the data transfer request message, the blockchain provider computer(s) 104 may be configured to record the net transfer amount in a ledger suitable for recording such information. In some cases, the blockchain provider computer(s) 104 may be configured to transmit a data transfer response message to the data processing computer(s) 108 to indicate whether recording the net transaction amount within the ledger was successful or unsuccessful.

It should be appreciated that any reference to "opening a channel" may, in some embodiments include creation of an electronic record that may be associated with two or more channel participants. While a channel is open (the electronic record exists), any suitable number of transactions (e.g., information included in a data transfer request/response message) may be recorded in the electronic record. Any reference to "closing a channel" may, in some embodiments include deletion of a previously-created electronic record that may be associated with two or more channel participants. Prior to closing a channel (e.g., deleting the electronic record), amounts corresponding to any suitable number of transactions recorded in the electronic record may be aggregated and information related to the aggregation (e.g., an overall transaction amount) may be provided (e.g., to a blockchain provider computer).

In at least one embodiment, messages between the computers, networks, and devices in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Each of the entities in FIG. 1 may communicate through any suitable communication channel or communications network. A suitable communications network (e.g., the network 106) may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
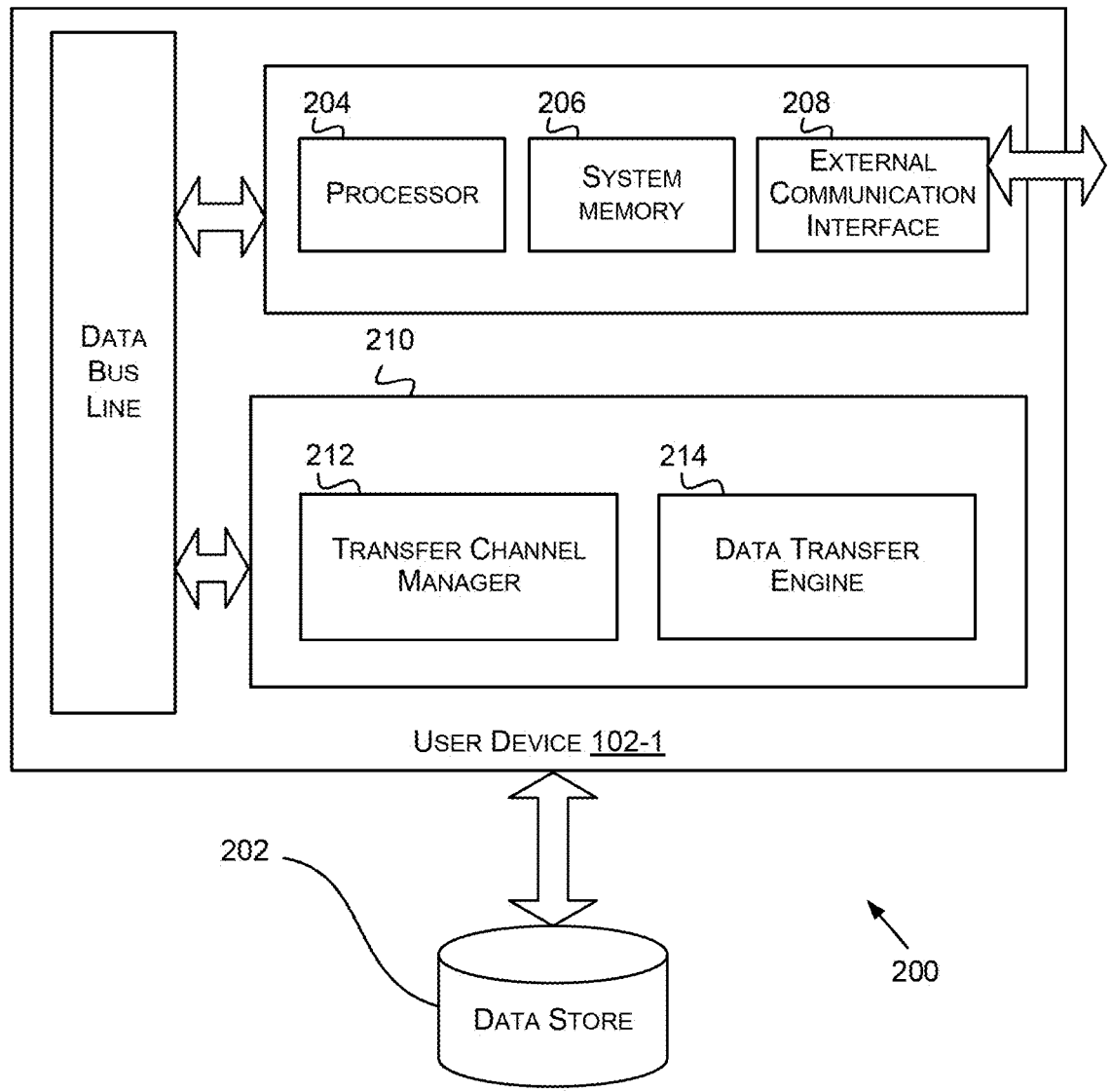
FIG. 2 depicts an example computer architecture capable of implementing at least some embodiments of a user device of FIG. 1.

FIG. 2 depicts an example computer architecture 200 capable of implementing at least some embodiments of a user device (e.g., the user device 102-1 of FIG. 1, an example of the user device(s) 102 of FIG. 1) of the system 100 of FIG. 1. The user device 102-1 may include a processor 204 and a computer readable medium 210 coupled to the processor, the computer readable medium 210 comprising code, executable by the processor 204 for performing the functionality described herein. It should be appreciated that any functionality described with respect to the modules of FIG. 2 may be combined to be performed by a single module or may be performed by a module that is external to the user device 102-1. FIG. 2 shows the user device 102-1 communicatively couple to the data store 202.

The data store 202 may be configured as depicted in FIG. 2, or the data store 202 may be provided, in whole or in part, as part of the user device 102-1. The data store 202 may be a conventional, fault tolerant, relational, scalable, secure database such as Oracle™ or Sybase™. The data store 202 may be implemented using various data structures, such as an array, hash map, (linked) list, structured text file (e.g., XML), table, and/or the like. Such data structures may be stored in memory and/or in structured files. The data store 202 may configured to store cryptographic key pairs associated with the user device 102-1 (and/or a particular transfer channel).

The processor 204 may be coupled to a system memory 206 and an external communication interface 208. The computer readable medium 210 may also be operatively coupled to the processor 204.

The computer readable medium 210 may comprise a number of software and/or hardware modules including a transfer channel manager 212 and a data transfer engine 214. More or fewer software/hardware modules may be utilized to perform the functionality described herein. In at least one example, the transfer channel manager 212 and/or the data transfer engine 214 may be included in a software application stored in the computer readable medium 210 and operating on the user device 102-1.

The transfer channel manager 212 may comprise code, that when executed, causes the processor 204 to process transfer channel request/response messages. In some cases, the transfer channel manager 212 may cause the processor 204 to receive (e.g., via an application operating on the user device 102-1) an indication that the user of the user device 102-1 desires to conduct data transfers with another user of another user device. In response to the request, the transfer channel manager 212 may be configured to cause the processor 204 to send a transfer channel request message to another electronic device (e.g., another user device, the data processing computer(s) 108 of FIG. 1, etc.).

In at least one example, the transfer channel manager 212 may be configured to receive transfer channel response messages (e.g., from another user device and/or from the data processing computer(s) 108). The transfer channel manager 212 may be configured to cause the processor 204 to extract a token (e.g., an amount and/or threshold limit), a public key, and/or a private key from a received transfer channel response message. Upon extraction, or at another suitable time, the transfer channel manager 212 may be configured to cause the processor 204 to store the token (e.g., an amount and/or threshold limit) and/or the public/private keys in the data store 202, or another suitable storage location. In some embodiments, the functionality of the data transfer engine 214 may be disabled until a token and/or a public private key pair has been received by the transfer channel manager 212 and/or stored in the data store 202.

In at least one example, the data transfer engine 214 may be configured to cause the processor 204 to receive an indication that a data transfer is to be initiated (e.g., from a user of the user device 102-1 via, for example, an application operating on the user device 102-1). The indication may specify at least a data transfer value (e.g., a denomination of cybercurrency or fiat currency) and an intended recipient of the data transfer (e.g., another user device associated with another user). In some examples, upon receipt of such an indication, the data transfer engine 214 may be configured to transmit an authorization request message to an issuer of a payment account associated with the user of the user device 102-1. The authorization request message may be utilized to reserve funds associated with the user's payment account for the transfer channel to be created. In some examples, the data transfer engine 214 may be configured to cause the processor 204 to maintain a current amount available for transfer (e.g., in a record stored in the data store 202). In at least one example, the current amount available may be initially set to an amount authorized via an authorization request message. In other examples, the data transfer engine 214 may utilize a user-specified value as the current amount available for transfer without requiring an authorization request message to be utilized.

In at least one embodiment, the data transfer engine 214 may be configured to cause the processor 204 to access the private key stored in the data store 202. In some examples, the data transfer engine 214 may cause the processor 204 to generate a data transfer request message from the data received in the indication. The data transfer engine 214 may be further configured to cause the processor 204 to utilize the private key to digitally sign the data transfer request message. In at least one embodiment, the data transfer engine 214 may be configured to cause the processor 204 to transmit a signed (or unsigned) data transfer request message (e.g., to another user device and/or the data processing computer(s) 108 of FIG. 1). In some examples, the data transfer engine 214 may be configured to cause the processor 204 to receive a data transfer response message (e.g., from another user device and/or the data processing computer(s) 108) indicating that the data transfer request was successful or unsuccessful. The data transfer engine 214 may be configured to cause the processor 204 to update a record contained in the data store 202 that maintains a current amount available to the user of the user device 102-1 for transfers (e.g., for transfer overall, or for a specific transfer channel associated with one or more other users). Additionally, or alternatively, a current amount available to the user may be received as part of the data transfer response message. The data transfer engine 214 may be configured to cause the processor 204 to provide the current amount to the user (e.g., via the application operating on the user device 102-1) at any suitable time.

As a non-limiting example, the user of the user device 102-1 may initiate a data transfer of $20 to another user of another user device. Upon receiving a data transfer response message indicating that the data transfer was successful, the current amount may be ascertained (e.g., upon an update of the electronic record stored in the data store 202 or from extracting the current amount from the received data transfer response message) and provided for display to the user of the user device 102-1 (e.g., via an application operating on the user device 102-1). Thus, in an example where the user of the user device 102-1 previously had $100 dollars, the data transfer would decrease the amount to $80 and an indication could be provided to the user (e.g., via the application operating on the user device 102-1).

In at least one embodiment, the data transfer engine 214 may be configured to receive a data transfer request message (e.g., from another user device and/or the data processing computer(s) 108 of FIG. 1. The received data transfer request message may be ultimately initiated by another user who wishes to transfer data to the user of the user device 102-1. In at least one example, the data transfer engine 214 may cause the processor 204 to provide information from the data transfer request message to the user of the user device 102-1 (e.g., via an application operating on the user device 102-1). The data transfer engine 214 may be configured to cause the processor 204 to receive an indication from the user (e.g., via the application operating on the user device 102-1) that approves or rejects the requested data transfer. The data transfer engine 214 may be configured to cause the processor 204 to generate and transmit a data transfer response message based on the approval/rejection. For example, the data transfer response message transmitted by the data transfer engine 214 may indicate that the data transfer was approved or rejected.

In at least one example, the data transfer engine 214 may be configured to cause the processor 204 to provide an indication to the user that the data transfer was successful or unsuccessful. In at least one embodiment, the data transfer engine 214 may be configured to cause the processor 204 to extract a current amount available to the user for transfers from the data transfer response message. In some examples, the data transfer engine 214 may be configured to cause the processor 204 to update a record stored in the data store 202 that maintains a current amount available to the user of the user device 102-1 for transfers (e.g., for transfer overall, or for a specific transfer channel associated with one or more other users). In at least one embodiment, the data transfer engine 214 may be configured to cause the processor 204 to provide the current amount to the user of the user device 102-1 (e.g., via an application running on the user device 102-1).

As a non-limiting example, the data request message received may be a request to transfer $40 from another user to the user of the user device 102-1. If the user approves the data transfer requested, the data transfer engine 214 may provide an indication to the user that $40 has been transferred (e.g., the current amount available for transfers has been increased by $40). In some examples, the data transfer engine 214 may be configured to cause the processor to provide the user with a current amount available.

Figure 3:
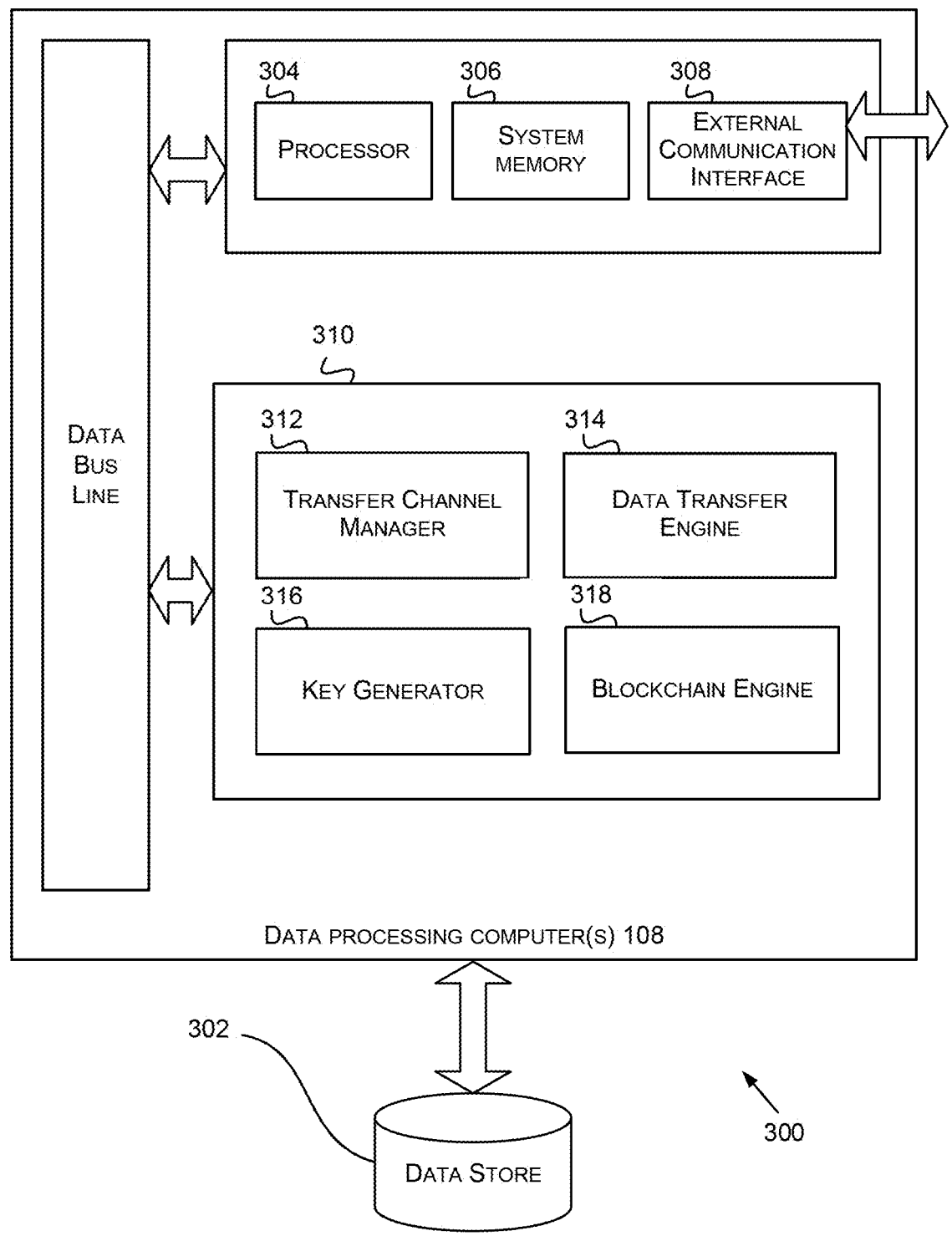
FIG. 3 depicts an example computer architecture capable of implementing at least some embodiments of a data processing computer of FIG. 1.

FIG. 3 depicts an example computer architecture 300 capable of implementing at least some embodiments of the data processing computer(s) 108 of the system 100 of FIG. 1. The data processing computer(s) 108 may individually include a processor 304 and a computer readable medium 310 coupled to the processor 304, the computer readable medium 310 comprising code, executable by the processor 304 for performing the functionality described herein. It should be appreciated that any functionality described with respect to the modules of FIG. 3 may be combined to be performed by a single module or may be performed by a module that is external to the data processing computer(s) 108. FIG. 3 shows the data processing computer(s) 108 communicatively couple to the data store 302. The data store 302 may be configured as depicted in FIG. 3, or the data store 302 may be provided, in whole or in part, as part of the data processing computer(s) 108. The data store 302 may be a conventional, fault tolerant, relational, scalable, secure database such as Oracle™ or Sybase™. The data store 302 may be implemented using various data structures, such as an array, hash map, (linked) list, structured text file (e.g., XML), table, and/or the like. Such data structures may be stored in memory and/or in structured files. The data store 302 may configured to store cryptographic key pairs associated with the user device(s) 102 of FIG. 1. The data store 302 may be configured to store one or more electronic records that may be individually associated with two or more of the user device(s) 102 and/or with a particular transfer channel. The stored electronic records may individually maintain any suitable number of data transfers associated with two user devices.

The processor 304 may be coupled to a system memory 306 and an external communication interface 308. The computer readable medium 310 may also be operatively coupled to the processor 304.

The computer readable medium 310 may comprise a number of software and/or hardware modules including a transfer channel manager 312, a data transfer engine 314, a key generator 316, and a blockchain engine 318. More or fewer software/hardware modules may be utilized to perform the functionality described herein. It should be appreciated that it is contemplated that any portion of the functionality described with respect to the data processing computer(s) 108 may alternatively be provided by one or more user devices (e.g., the user device(s) 102 of FIG. 1) as part of a software/hardware module (e.g., an application) operating on the respective user device.

The transfer channel manager 312 may comprise code, that when executed, causes the processor 304 to process transfer channel request/response messages (e.g., from the user device(s) 102) and/or token request/response messages (e.g., from the blockchain provider computer(s) 104 of FIG. 1).

In at least one example, in response to receiving a transfer channel request message (e.g., from the user device 102-1), the transfer channel manager 312 may be configured to cause the processor 304 to request a token (e.g., via a token request message) from a blockchain provider (e.g., the blockchain provider computer 104). The transfer channel manager 312 may further be configured to cause the processor 304 to receive a token response message from the blockchain provider that includes a token (e.g., an amount and/or threshold limit) associated with a user device (e.g., the user device 102-1). The transfer channel manager 312 may be configured to cause the processor 304 to extract a token (e.g., an amount and/or threshold limit) from a received token response message. Upon extraction, or at another suitable time, the transfer channel manager 312 may be configured to cause the processor 304 to store the token in the data store 302, or another suitable storage location. As a non-limiting example, the transfer channel manager may create an electronic record associated with the user device 102-1 and the user device 102-2 and may store the received token (e.g., an amount and/or threshold limit) as an association with the user device 102-1 within the electronic record, or in a separate record. In at least one example, the transfer channel manager 312 may be configured to cause the processor 304 to extract a threshold limit from the transfer channel request message and associate the threshold limit with the user device 102-1 and/or with the electronic record.

In at least one embodiment, the transfer channel manager 312 (e.g., upon receipt of a transfer channel request message or upon receipt of the token response message) may be configured to cause the processor 304 to stimulate the key generator 316 to generate a public/private key pair for the user device (e.g., the user device 102-1). In some examples, the key generator 316 may be configured to cause the processor 304 generate a public/private key pair for the user device and to maintain an association (e.g., in the electronic record, or another suitable record stored in the data store 302) between the public key and the user device for which the public/private key was generated.

In at least one embodiment, the transfer channel manager 312 may be configured to cause the processor 304 to transmit or forward the transfer channel request message to another user device (e.g., the user device 102-2 of FIG. 1) indicated in the received transfer channel request message. As a non-limiting example, the transfer channel manager 312 may be configured to cause the processor 304 to transmit/forward the transfer channel request message to the user device 102-2 upon receipt and/or storage of the token (e.g., an amount and/or threshold limit) associated with the user device 102-1. The transfer channel manager 312 may be configured to cause the processor 304 to receive a transfer channel response message from the user device 102-2 indicating either that the transfer channel was approved or rejected. In some cases, the transfer channel response message may include a threshold limit associated with the user device 102-2. In at least one example, the transfer channel manager 312 may be configured to cause the processor 304 to extract the threshold limit from the transfer channel response message and associate the threshold limit with the user device 102-2. If the transfer channel request is approved, the transfer channel manager 312 may be configured to cause the processor 304 to repeat the token request process described above in order to alert the blockchain provider of a token (e.g., an amount and/or threshold limit) associated with the user device 102-2. The token received for the user device 102-2 may be stored as an association with the user device 102-2 within the electronic record associated with the user device 102-1 and the user device 102-2, or in a separate record. In examples in which the transfer channel request is rejected, the transfer channel manager 312 may be configured to cause the processor 304 to delete the electronic record and to transmit a transfer channel response message to the user device 102-1 indicating that the channel request was rejected.

In at least one embodiment, the transfer channel manager 312 (e.g., upon receipt of a transfer channel response message indicating that the transfer channel is approved) may be configured to cause the processor 304 to stimulate the key generator 316 to generate a public/private key pair for the user device 102-2. In some examples, the key generator 316 may be configured to cause the processor 304 generate a public/private key pair for the user device 102-2 and to maintain an association (e.g., in the electronic record, or another suitable record stored in the data store 302) between the public key and the user device 102-2 for which the public/private key was generated. The public and/or private key may be transmitted (e.g., by a transfer channel response message) by the processor 304 to the user device 102-2 for storage.

In at least one embodiment, the transfer channel manager 312 may be configured to transmit a transfer channel response message to the initiator of the transfer channel request message (e.g., the user device 102-1) that indicates that the transfer channel has been approved. The transfer channel response message may include the public and/or private key associated with the user device 102-1.

In at least one example, the data transfer engine 314 may be configured to cause the processor 304 to receive a data transfer request message (e.g., from the user device 102-1). Upon receipt, or at another suitable time, the data transfer engine 314 may utilize a public key associated with the initiator (e.g., the user device 102-1) to verify the digitally signature data field if the data transfer request message. The verified information may be used to validate that the message was in fact sent by the initiator and that the message has not been tampered with. In some embodiments, the data transfer engine 314 may be configured to cause the processor 304 to access one or more threshold limits stored in the electronic record and associated with the initiator of the request (e.g., the user device 102-1). If the data transfer request conforms to the threshold limit (e.g., a combined monetary amount associated with the current and previous data transfers does not exceed the threshold limit) than the data transfer engine 314 may be configured to cause the processor 304 to forward the data transfer request message to the intended recipient (e.g., the user device 102-2). If the data transfer request would cause the threshold limit to be exceeded, then the data transfer engine 314 may be configured to cause the processor 304 to reject the data transfer request message by sending a data transfer response message back to the recipient indicating that the transfer is rejected. In some cases, the data transfer response message may include a code or some indication as to the reason the data transfer request was rejected.

In some embodiments, the data transfer engine 314 may receive a data transfer response message from the intended recipient of the data transfer (e.g., the user device 102-2). The data transfer response message may indicate whether the recipient has accepted or rejected the data transfer. Upon receipt of a data transfer response message indicating acceptance of the data transfer, or at another suitable time, the data transfer engine 314 may be configured to cause the processor 304 to transmit a data transfer response message to the initiator of the data transfer request (e.g., the user device 102-1) indicating that the data transfer was successful/accepted. As a result, the data transfer engine 314 may be configured to cause the processor 304 to record the data transfer in an electronic record (e.g., the electronic record associated with the user device 102-1 and the user device 102-2 that is stored in the data store 202).

In at least one embodiment, the transfer channel manager 312 may be configured to cause the processor 304 to receive a transfer channel request message that indicates that a user (e.g., the user of the user device 102-1) desires to close the channel. The transfer channel request message may be digitally signed and the transfer channel manager 312 may be configured to cause the processor 304 to verify the message using the public key associated with the initiator (e.g., the public key stored in the electronic record and associated with the user device 102-1). If the message is valid, the transfer channel manager 312 may be configured to cause the processor 304 to determine which devices have been recipients in any previously-processed data transfers. If the user device that is initiating the close channel request is the only recipient of previously-processed data transfers, then the transfer channel manager 312 may cause the processor 304 to proceed with close channel procedures. If, however, the other user device (e.g., the user device 102-2) was a recipient of a previously-processed data transfer, the transfer channel manager 312 may be configured to cause the processor 304 to forward the transfer channel request message to the other device (e.g., the user device 102-2) in order to stimulate a transfer channel request message from the other device indicating that the user of the other device agrees to close the channel. In at least one embodiment, the transfer channel manager 312 may be configured to wait until the processor 304 receives such an indication before proceeding with close channel procedures.

In at least one embodiment, the transfer channel manager 312 may be configured to cause the processor 304 to receive a transfer channel request message from the other device (e.g., the user device 102-2) indicating that the close channel request has been approved. This message may be digitally signed by the initiator (e.g., the user device 102-2) and the transfer channel manager 312 may cause the processor 304 to utilize the public key associated with the user device (e.g., the user device 102-2) to verify the message in order to validate the message and to ensure its integrity. Upon determining that the transfer channel request message is valid, the transfer channel manager 312 may stimulate the blockchain engine 318 to begin aggregation procedures.

In at least one embodiment, the blockchain engine 318 may be configured to cause the processor 304 to aggregate all previously-processed data transfers contained within the electronic record associated with two or more devices (e.g., the user device 102-1 and the user device 102-2). The blockchain engine 318 may be configured to cause the processor 304 to calculate a net transfer value according to the aggregation. In at least some examples, the blockchain engine 318 may format the net transfer value to conform to a data format that enables the net transfer value to be immediately recorded in a blockchain (e.g., a ledger) maintained by a blockchain provider. The blockchain engine 318 may cause the net transfer value to be transmitted (e.g., via a data transfer request message) to the blockchain provider computer(s) 104. Upon receipt, or at another suitable time, the blockchain provider computer(s) 104 may cause the net transfer value to be recorded in the ledger as a single transaction.

Figure 4:
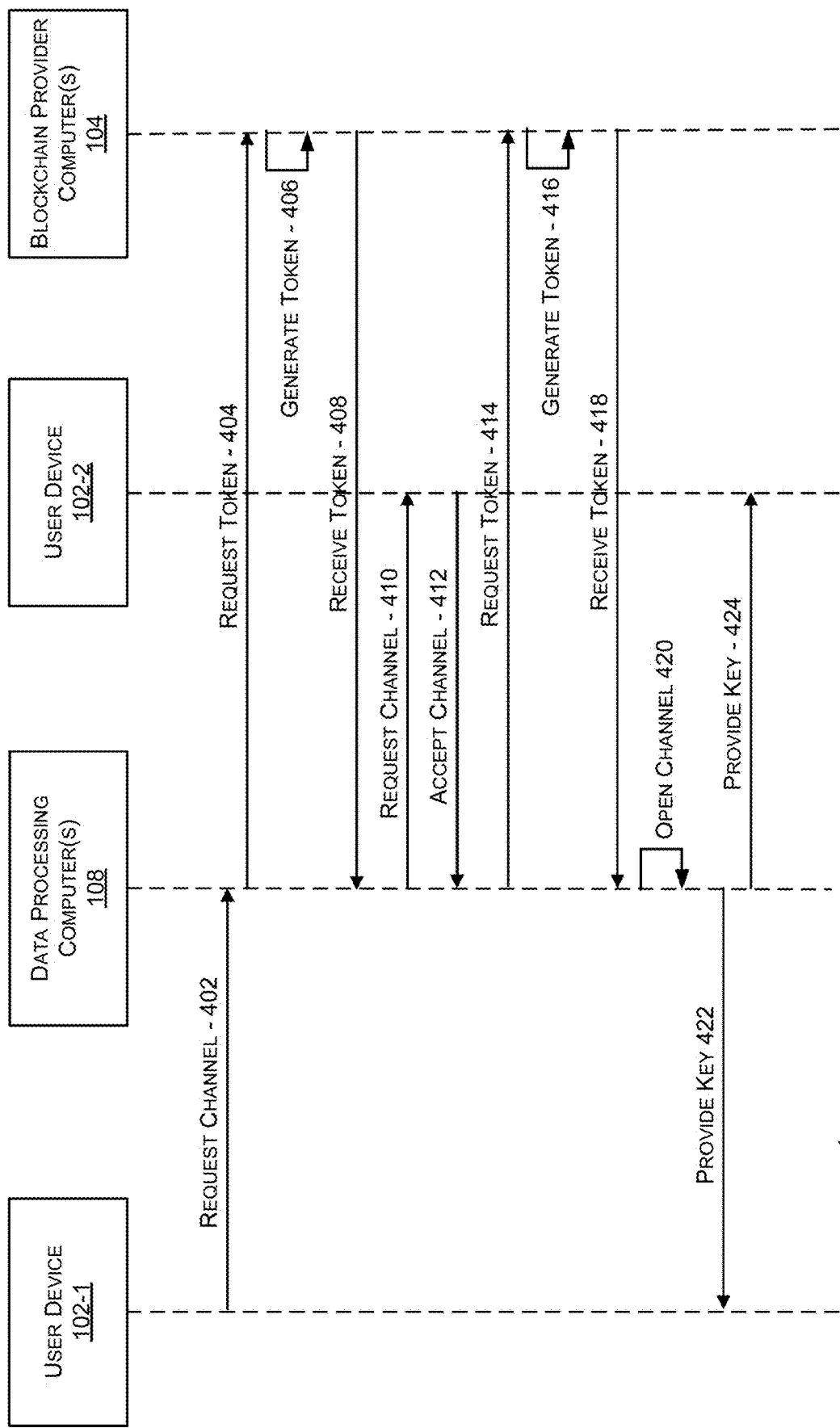
FIG. 4 shows a flow diagram of a method for creating a transfer channel.

FIG. 4 shows a flow diagram of a method 400 for creating a transfer channel. At step 402, the user device 102-1 may request a channel with the user device 102-2 by transmitting a transfer channel request message to the data processing computer(s) 108. The transfer channel request message may include a threshold limit associated with the user device 102-2 indicating a total transaction amount that the user does not wish to exceed for data transfers occurring within the channel.

At step 404, upon receipt of the transfer channel request message, the data processing computer(s) 108 may request the blockchain provider to associate a token (e.g., an amount and/or threshold limit) with the user device 102-1. The token may be requested utilizing a token request message. In some examples, the token request message may include payment information (e.g., a credit card and/or payment account information) associated with the user of the user device 102-1.

At step 406, the blockchain provider computer(s) 104 may record a token (e.g., an amount and/or threshold limit) as an association with the user device 102-1 and may record the association within a ledger managed by the blockchain provider. In some cases, recording the association within the ledger effectively reserves an amount (e.g., a denomination of digital or fiat currency corresponding to the token) within the blockchain ledger to be used in a particular channel and/or by a particular user. In some embodiments, this prevents the amount from being used in other channels or elsewhere within the blockchain ledger. In at least one embodiment, requesting that a token be associated with a user device may include generating and transmitting an authorization request message to a third party (e.g., a financial institution associated with the payment information included in the token request message). The authorization request message may cause the third party to verify available funds associated with the payment information. An authorization response message may be received by the blockchain provider computer(s) 104 indicating that the funds are available or that the funds are not available. In some cases, associating a token (e.g., an amount and/or threshold limit) with a user device may depend on receiving an authorization response message indicating that the funds are available. In at least one embodiment, the funds associated with authorization response message may be provided to the blockchain provider to be held during existence/execution of the channel.

At step 408, the data processing computer(s) 108 may receive the token (e.g., an amount and/or threshold limit) from the blockchain provider. In some embodiments, the data processing computer(s) 108 may store the token (e.g., an amount and/or threshold limit) as being associated with the user device 102-1.

At step 410, the data processing computer(s) 108 may forward the channel request to the user device 102-2. In some embodiments, the channel request may be transmitted in a transfer channel request message.

At step 412, the data processing computer(s) 108 may receive a message indicating that the transfer channel was accepted/approved. In some embodiments, the acceptance/approval may be received via a transfer channel response message. The transfer channel response message may include a threshold limit associated with the user device 102-2 indicating a total transaction amount that the user does not wish to exceed for data transfers occurring within the channel.

At step 414, upon receipt of the transfer channel response message, the data processing computer(s) 108 may request that a token be associated with the user device 102-2 by the blockchain provider on behalf of the user device 102-2. The token (e.g., an amount and/or threshold limit) may be requested utilizing a token request message.

At step 416, the blockchain provider computer(s) 104 may associated a token (e.g., an amount and/or threshold limit) with the user device 102-2 and may record the token (e.g., an amount and/or threshold limit) within a ledger managed by the blockchain provider. In some cases, recording the token within the ledger effectively makes an amount (e.g., a denomination of digital or fiat currency) unspendable within the blockchain ledger. In some embodiments, this prevents the amount from being double-spent.

At step 418, the data processing computer(s) 108 may receive the token (e.g., an amount and/or threshold limit) from the blockchain provider. In some embodiments, the data processing computer(s) 108 may store the token (e.g., an amount and/or threshold limit) as being associated with the user device 102-2.

At step 420, the data processing computer(s) 108 may perform a set of instructions to open a channel between the user device 102-1 and the user device 102-2. In at least one embodiment, opening a channel may include creating an electronic record associated with the user device 102-1 and the user device 102-2. The data processing computer(s) 108 may generate a public/private key pair for the user device 102-1 and a different public/private key pair for the user device 102-2. In some examples, the public and/or private keys for each device may be stored in or otherwise associated with the electronic record. In at least one embodiment, the threshold limit received via the transfer channel request message received from the user device 102-1 may be stored in, or otherwise associated with, the electronic record. Similarly, the threshold limit received via the transfer channel response message received from the user device 102-2 may be stored in, or otherwise associated with, the electronic record.

At step 422, the data processing computer(s) 108 may provide the public and/or private key associated with the user device 102-1 to the user device 102-1 via, for example, a transfer channel response message. Similarly, the data processing computer(s) 108 may provide the public and/or private key associated with the user device 102-2 to the user device 102-2 via, for example, another transfer channel response message.

Upon completion of the method described above in connection with FIG. 4, the user device 102-1, the user device 102-2, and the data processing computer(s) 108 may proceed with processing data transfer request/response messages.

Figure 5:
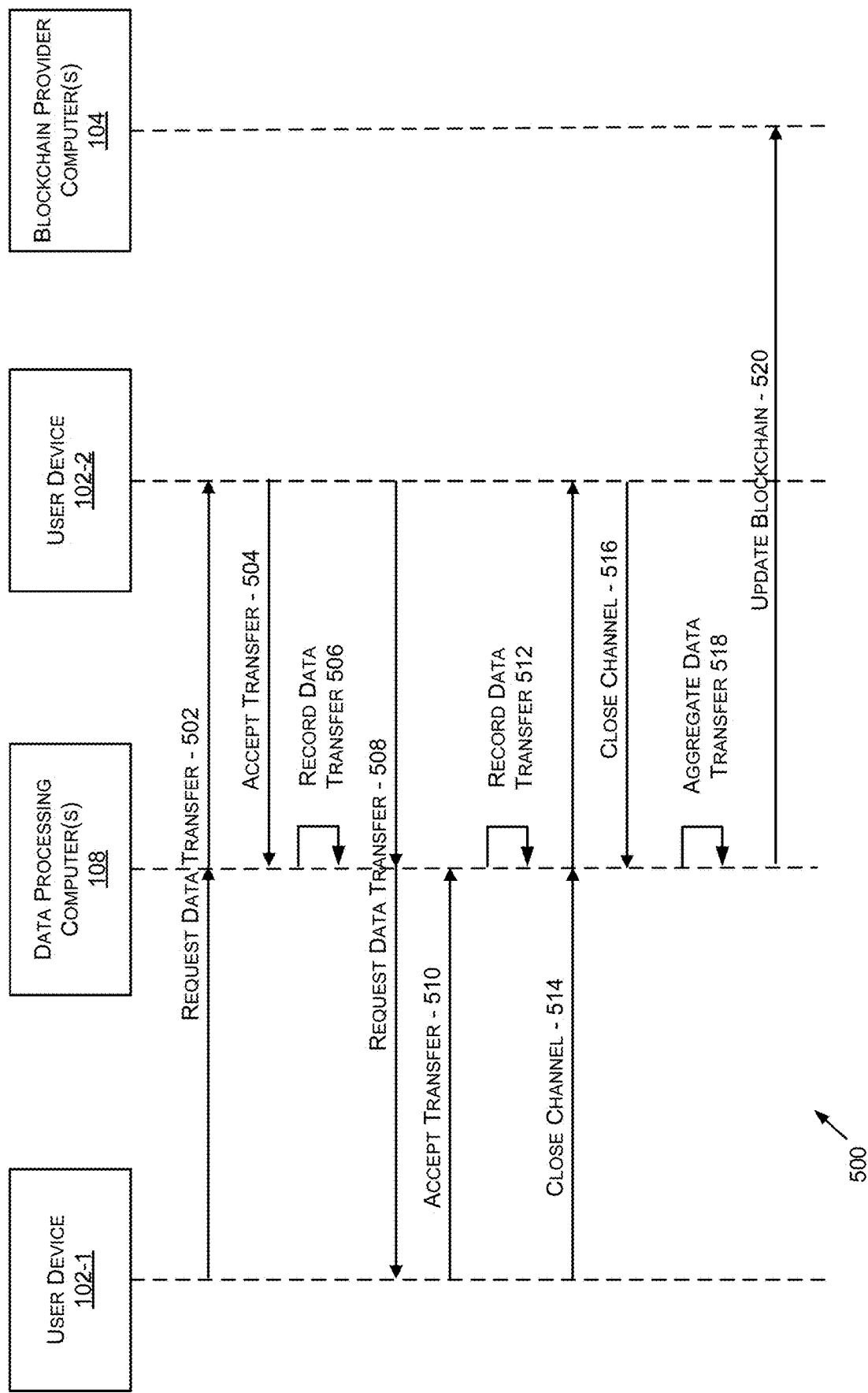
FIG. 5 shows a flow diagram of a method for updating a blockchain ledger.

FIG. 5 shows a flow diagram of a method 500 for updating a blockchain ledger. At step 502, the user device 102-1 may request a data transfer. In some examples, the user device 102-1 may request the data transfer by transmitting a data transfer request message to the data processing computer(s) 108. In some examples, the data transfer request message may be digitally signed using a private key associated with the user device 102-1. The data processing computer(s) 108 may utilize a public key associated with the user device 102-1 to verify the data transfer request message in order to verify its authenticity and validity. In some examples, the data processing computer(s) 108 may determine whether or not the data transfer would violate a threshold limit associated with the user device 102-1 and/or the electronic record associated with the user device 102-1 and the user device 102-2. If the message is valid and if the threshold limit is not violated, the data processing computer(s) 108 may forward the (unencrypted) data transfer request message to the user device 102-2 for processing.

At step 504, the user device 102-2 may transmit a message (e.g., a data transfer response message) indicating that the transfer has been accepted. Upon receipt of the data transfer response message, the data processing computer(s) 108 may record the data transfer at step 506. In at least one embodiment, the data processing computer(s) 108 may record the data transfer in an electronic record associated with the user device 102-1 and the user device 102-2.

At step 508, the user device 102-2 may request a data transfer. In some examples, the user device 102-2 may request the data transfer by transmitting a data transfer request message to the data processing computer(s) 108. In some examples, the data transfer request message may be digitally signed using a private key associated with the user device 102-2. The data processing computer(s) 108 may utilize a public key associated with the user device 102-2 to verify the data transfer request message in order to verify its authenticity and validity. In some examples, the data processing computer(s) 108 may determine whether or not the data transfer would violate a threshold limit associated with the user device 102-2 and/or the electronic record associated with the user device 102-1 and the user device 102-2. If the message is valid and if the threshold limit is not violated, the data processing computer(s) 108 may forward the (unencrypted) data transfer request message to the user device 102-1 for processing.

At step 510, the user device 102-1 may transmit a message (e.g., a data transfer response message) indicating that the transfer has been accepted. Upon receipt of the data transfer response message, the data processing computer(s) 108 may record the data transfer at step 512. In at least one embodiment, the data processing computer(s) 108 may record the data transfer in an electronic record associated with the user device 102-1 and the user device 102-2.

At step 514, the user device 102-1 may transmit a transfer channel request message that indicates that the user wishes to close the channel. The transfer channel request message, in some embodiments, may be digitally signed. The data processing computer(s) 108 may verify the transfer channel request message with the public key associated with the user device 102-1 to verify its authenticity and integrity. It should be appreciated that, in some embodiments, a request to close a channel is received in a digitally signed transfer channel request message. The data processing computer(s) 108 may forward the transfer channel request message to the user device 102-2.

At step 516, the user device 102-2 may transmit a transfer channel response message that indicate that the user approves the request to close the channel. The transfer channel response message, in some embodiments, may be digitally signed. The data processing computer(s) 108 may verify the transfer channel response message with the public key associated with the user device 102-1 to verify its authenticity and integrity. It should be appreciated that, in some embodiments, a response to close a channel must be received in a digitally signed transfer channel response message. Although, in this example, the user device 102-2 transmits a transfer channel response message, it should be appreciated that the user device 102-2 may instead transmit a digitally signed transfer channel request message indicating that the user wants the channel to be closed.

At step 518, the data processing computer(s) 108 may aggregate the data transfers of the electronic record associated with the user device 102-1 and the user device 102-1. The data processing computer(s) 108 may calculate a net transfer value indicating a one-way transfer. For example, if the user device 102-1 transfer more data than the user device 102-2, then the net transfer value would indicate a single data transfer from the user device 102-1 to the user device 102-2.

At step 520, the data processing computer(s) 108 may cause the blockchain maintained by the blockchain provider computer(s) 104 to be updated. In at least one embodiment, the data processing computer(s) 108 may transmit a data transfer request message to the blockchain provider computer(s) 104 that indicates a data transfer for the net transfer value. Continuing with the example above, the data transfer request message may indicate that the user device 102-1 transferred data in the amount of the net transfer value to the user device 102-2. In at least one embodiment, the data transfer request message may include the net transfer value. The net transfer value may be pre-formatted by the data processing computer(s) 108 in a blockchain format that enables the net transfer value to be immediately recordable in the ledger managed by the blockchain provider computer(s) 104.

In at least one embodiment, the transfer request message may further include one or more tokens (e.g., one or more amounts and/or threshold limits) associated with the participants of the channel. In some examples, updating the blockchain may further include replacing, deleting, or otherwise reversing an amount associated with to token(s). For example, a token (e.g., an amount and/or threshold limit) associated with the user device 102-1 may have initially been requested from a financial institution associated with the user of the user device 102-1 (e.g., via an authorization request message). Upon receipt of an authorization response message, or at another suitable time, the blockchain provider may indicate the addition of the amount associated with the token within the blockchain. The amount may be associated with the channel such that those funds are usable only within the channel. As part of a process for closing a channel, a transfer request message including a net transfer value (e.g., $100) may be provided to the blockchain provider. The blockchain provider may be configured to record the actual transfer of $100 and release the remaining funds (e.g., the remaining $100 of the original unspendable $200) such that the remaining funds become spendable for other channels in which the user may participate. In at least one embodiment, the blockchain provider may perform one or more transactions with a financial institution to return any remainder. Thus, if $200 was originally requested and authorized by the financial institution, upon determining that only $100 was spent of the $200, may cause the blockchain provider to perform one or more transactions to return the $100 to the account of the user that is managed by the financial institution.

Figure 6:
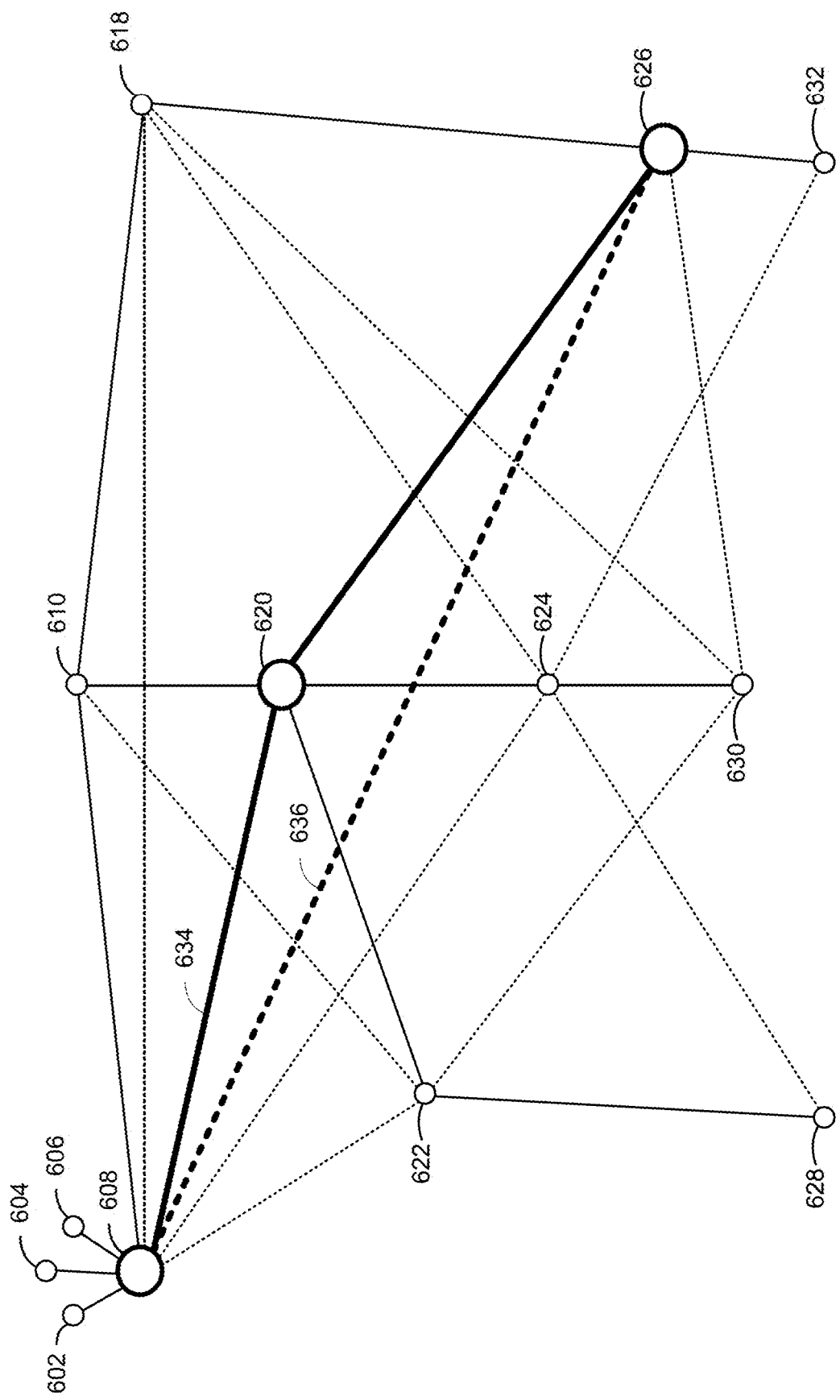
FIG. 6 shows a schematic diagram illustrating a trust environment.

FIG. 6 shows a schematic diagram 600 illustrating a trust environment. In at least one embodiment, each of the nodes 602-632 may indicate an individual or entity. Solid lines, such as solid line 634, may indicate a direct trust relationship between two nodes (e.g., the node 608 and the node 620). Dotted lines, such as the dotted line 636, may indicate an indirect trust relationship.

As a non-limiting examples, nodes 602-632 may depict family members and their respective friends. As an example, the nodes 608, 610, and 620 may each be members of a family. The node 608 may represent a father. The node 610 may represent a mother. The node 620 may represent the child of the mother and the father. Node 622, node 624, and node 626 may represent friends of the child's. Nodes 602, 604, and 606 may represent friends of the father's. Node 618 may represent a friend of the mother's. Node 628 may represent a family member of the friend represented by the node 622. Similarly, node 630 may represent a family member of the friend represented by the node 622 and node 632 may represent a family member of the friend represented by the node 626.

In at least one embodiment, each of the solid lines may indicate a channel (e.g., an electronic record) that is maintained by the data processing computer(s) 108 of FIG. 1. Accordingly, in some examples, the data processing computer(s) 108 may maintain any suitable number of electronic records. These electronic records may enable the data processing computer(s) 108 to track both direct trust relationships as well as indirect trust relationships. In some examples, were the father (e.g., represented by node 608) wish to transfer data (e.g., cybercurrency, fiat currency, reward points, etc.) to a friend of his child's (e.g., represented by the node 626), the data processing computer(s) 108 may be configured to determine that he has an indirect trust relationship with that person.

Upon determining that the father (node 608) and the friend (node 626) have an indirect trust relationship, the data processing computer(s) 108 may cause an option (e.g., via an application operating on the respective user devices) to be presented allowing data transfers between the father and the friend. In some examples, the data processing computer(s) 108 may enable the father to make a data transfer through his child (e.g., represented by the node 620). For example, the data processing computer(s) 108 may be configured to receive a data transfer request message from the father's user device that indicates a recipient (the friend, node 626) for which a channel has not been established. The data processing computer(s) 108 may be further configured to determine that the father does have a channel with another user (e.g., the child) who does have a channel with the intended recipient (e.g., the friend). Accordingly, in some examples, the data processing computer(s) 108 may be configured to facilitate an exchange of messages between the father and child, and between the child and the friend, in order to achieve an equivalent of a data transfer between the father and the friend.

It should be appreciated that the schematic diagram 600 is intended to be illustrative in nature. The nodes may vary in number and may represent any individual/entity. For instance, instead of family and friends, the nodes 602-632 may represent businesses and business relationships. Any number of variations is possible.

Figure 7:
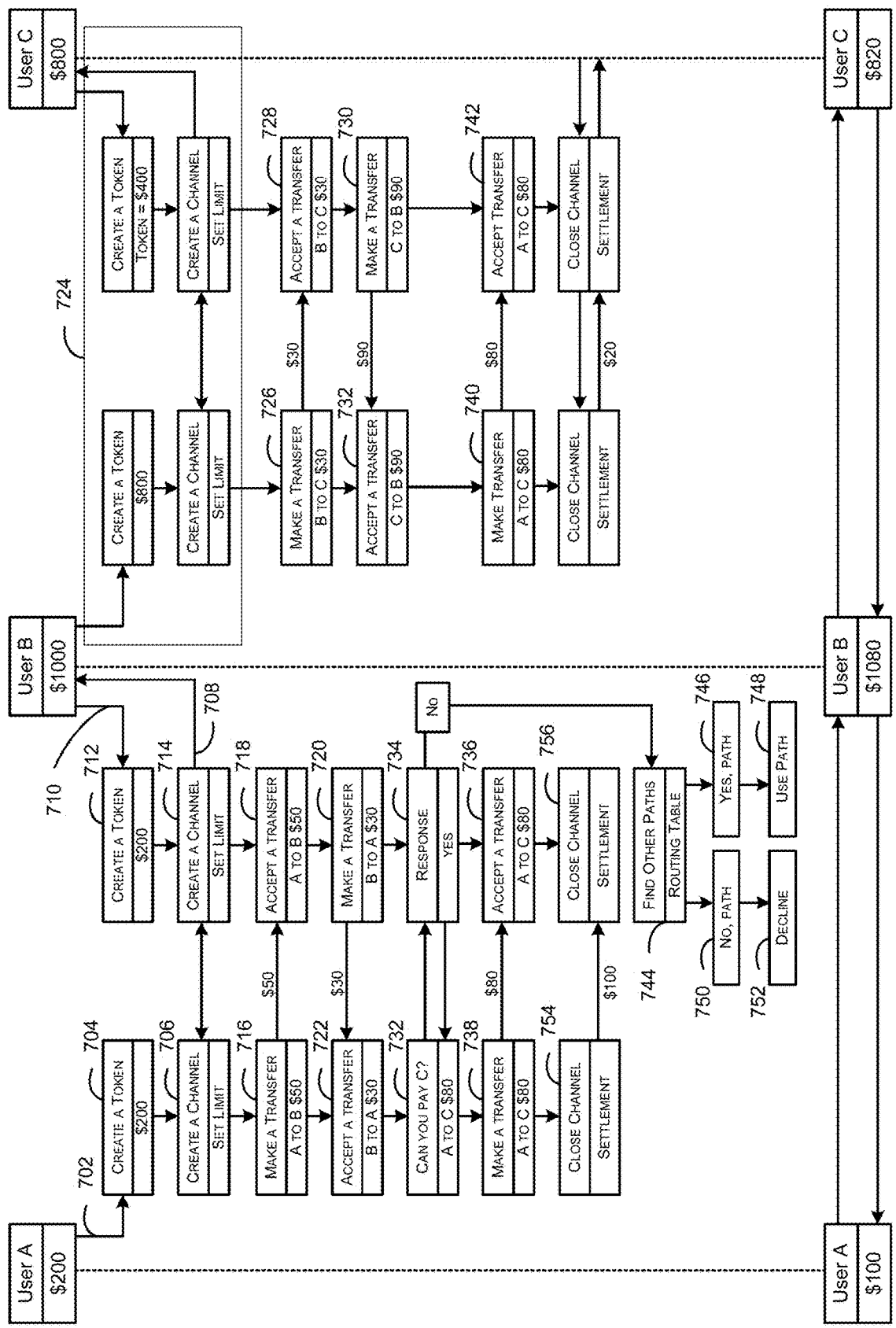
FIG. 7 shows a flow diagram illustrating a method for performing data transfers between two to three parties.

FIG. 7 shows a flow diagram 700 illustrating a method for performing data transfers between two to three parties (e.g., user A, user B, and user C). In at least one embodiment, the user A may initiate (e.g., via an application operating on the user A's device) a 702. The initiation may be in the form of a transfer channel request message transmitted to other device (e.g., the user device of user B or the data processing computer(s) 108 of FIG. 1). In some embodiments, the transfer channel request message may include a threshold limit (e.g., $200) that the user wishes to associate with the channel (e.g., the electronic record associated with the user A and the user B). In some examples, the threshold limit may indicate an amount that the user A does not want to exceed with respect to his combined data transfer performed in the channel.

At 704, a token may be created. The token may be requested from the blockchain provider computer(s) 104 of FIG. 1 by the user device of user A or by the data processing computer(s) 108 of FIG. 1 on behalf of user A. The token, in some cases, may be related to the threshold limit. For example, the blockchain provider computer(s) 104 may provision the token to represent $200 of fiat currency. The blockchain provider computer(s) 104 may record the token within a ledger in order to make the $200 unspendable elsewhere.

At 706, a channel creation may be attempted. In at least one embodiment, a transfer channel request message may be transmitted to the user device of user B. User B may be provided some indication (e.g., via an application operating on the device of user B) that a channel has been requested at 708. At 710, user B may indicate that the channel request is approved and as a result, a token may be created for user B in a similar manner as described above at 712. In the example depicted, user B's token is also associated with a $200 threshold limit, although it is not necessarily the case that the threshold limits of user A and user B will be the same.

In at least one embodiment, upon creation of the token for user B, a channel may be created at 714. In at least one example, upon channel creation an electronic record may be created/modified that is associated with user A and user B. As part of a channel creation procedure, the data processing computer(s) 108 may generate and distribute (e.g., via transfer channel response messages) respective public and/or private keys for user A and user B. In some cases, the device of the respective user may be responsible for generating its public/private key pair and may broadcast (e.g., via a transfer channel response message) its public key to the other device associated with the channel. As part of the channel creation procedure, the respective threshold limits of user A and user B may be stored in, or otherwise associated with, the electronic record.

In at least one embodiment, the user A may initiate a data transfer at 716. In some examples, the data transfer may be initiated by transmitting a data transfer request message from the device of user A to the data processing computer(s) 108. In at least one example, the data transfer request message may be transmitted directly from user A's device to user B's device. In at least one example, the data transfer request message may be digitally signed using the private key associated with user A. The recipient may utilize the public key associated with user A in order to verify and validate the message. As a non-limiting example, the data transfer request message may indicate that user A intends to transfer $50 to user B. In at least one embodiment, the data transfer request message may be analyzed in order to determine whether the transfer requested (e.g., $50) exceeds the threshold limit associated with the user A (e.g., $200). If the transfer requested does not exceed the threshold limit, then the process may proceed. In some cases, if the transfer requested does exceed the threshold limit associated with user A, then the transfer request may be automatically declined and the user A may be notified.

In at least one embodiment, user B may accept the data transfer at 718. In at least on example, information regarding the data transfer request may be presented to the user B on his device and user B may select whether to accept or reject the data transfer. In the case that user B accepts the data transfer, a data transfer response message may be transmitted back to the device of user A or the data processing computer(s) 108 as appropriate. Upon receive of the data transfer response message indicating that the data transfer has been approved, the electronic record may be updated to record the data transfer (e.g., $50 from user A to user B).

In at least one embodiment, the user B may initiate a data transfer at 720. In some examples, the data transfer may be initiated by transmitting a data transfer request message from the device of user B to the data processing computer(s) 108. In at least one example, the data transfer request message may be transmitted directly from user B's device to user A's device. In at least one example, the data transfer request message may be digitally signed using the private key associated with user B. The recipient may utilize the public key associated with user B in order to verify and validate the message. As a non-limiting example, the data transfer request message may indicate that user B intends to transfer $30 to user A. In at least one embodiment, the data transfer request message may be analyzed in order to determine whether the transfer requested (e.g., $30) exceeds the threshold limit associated with the user B (e.g., $200). If the transfer requested does not exceed the threshold limit, then the process may proceed. In some cases, if the transfer requested does exceed the threshold limit associated with user B, then the transfer request may be automatically declined and the user B may be notified.

In at least one embodiment, user A may accept the data transfer at 722. In at least on example, information regarding the data transfer request may be presented to the user A on his device and user A may select whether to accept or reject the data transfer. In the case that user A accepts the data transfer, a data transfer response message may be transmitted back to the device of user A or the data processing computer(s) 108 as appropriate. Upon receive of the data transfer response message indicating that the data transfer has been approved, the electronic record may be updated to record the data transfer (e.g., $30 from user B to user A).

In at least one embodiment, at a time before or after the creation of a channel for user A and user B, a channel may be created for user B and user C. In a similar manner as described above, the channel for user B and user C may be created at 724. In one example, user B may set a threshold limit of $800, while user C may set a threshold limit of $400. Upon completion of channel creation procedures at 724, an electronic record may be created and associated with both user B and user C. In some examples, the electronic record may be stored and maintained at one or both of the devices of user B and user C, while in other examples, the electronic record may be stored and maintained by the data processing computer(s) 108. The electronic record may maintain associations between the a first token and user B and a second token and user C. In some examples, the electronic record may maintain an association between a threshold limit of $800 for user B and a threshold limit of $400 for user C.

In at least one embodiment, the user B may initiate a data transfer at 726. In some examples, the data transfer may be initiated by transmitting a data transfer request message from the device of user B to the data processing computer(s) 108. In at least one example, the data transfer request message may be transmitted directly from user B's device to user C's device. In at least one example, the data transfer request message may be digitally signed using the private key associated with user B. The recipient may utilize the public key associated with user B in order to verify and validate the message. As a non-limiting example, the data transfer request message may indicate that user B intends to transfer $30 to user C. In at least one embodiment, the data transfer request message may be analyzed in order to determine whether the transfer requested (e.g., $30) exceeds the threshold limit associated with the user B (e.g., $800). If the transfer requested does not exceed the threshold limit, then the process may proceed. In some cases, if the transfer requested does exceed the threshold limit associated with user B, then the transfer request may be automatically declined and the user B may be notified.

In at least one embodiment, user C may accept the data transfer at 728. In at least on example, information regarding the data transfer request may be presented to the user C on his device and user C may select whether to accept or reject the data transfer. In the case that user C accepts the data transfer, a data transfer response message may be transmitted back to the device of user B or the data processing computer(s) 108 as appropriate. Upon receive of the data transfer response message indicating that the data transfer has been approved, the electronic record may be updated to record the data transfer (e.g., $30 from user B to user C).

In a similar manner as described above, user C may initiate a data transfer to user B for $90 at 730. At 732, user B may indicate that he approves the transfer. As a result, the electronic record may be updated to record the data transfer (e.g., from user C to user B).

In at least one embodiment, the user A may initiate a data transfer at 732. In some examples, the data transfer may be initiated by transmitting a data transfer request message from the device of user A to the data processing computer(s) 108. In at least one example, the data transfer request message may be transmitted directly from user A's device to user B's device. In at least one example, the data transfer request message may be digitally signed using the private key associated with user A. The recipient may utilize the public key associated with user B in order to verify and validate the message. As a non-limiting example, the data transfer request message may indicate that user A intends to transfer $80 to user C. In other words, the user A may request that user B pay user C on user A's behalf. In at least one embodiment, the data transfer request message may be analyzed in order to determine whether the transfer requested (e.g., $80) exceeds the threshold limit associated with the user B with respect to the channel between user B and user C (e.g., $800). If the transfer requested does not exceed the threshold limit, then the process may proceed. In some cases, if the transfer requested does exceed the threshold limit associated with user B, then the transfer request may be automatically declined and the user A may be notified.

In at least one embodiment, user B may accept the data transfer at 736. In at least on example, information regarding the data transfer request may be presented to the user B on his device and user B may select whether to accept or reject the data transfer. In the case that user B accepts the data transfer, a data transfer response message may be transmitted back to the device of user A or the data processing computer(s) 108 as appropriate. Upon receive of the data transfer response message indicating that the data transfer has been approved, the electronic record may be updated to record the data transfer (e.g., $80 from user A to user B).

In at least one embodiment, as a result of accepting the transfer at 736, a data transfer may be initiated at 740 between user B and user C. In at least one example, a (digitally signed) data transfer request message may be transmitted from user B's device to user C's device. The data transfer request message may indicate that the original transferor was user A. If the user C does not accept the data transfer request, the user B and/or the data processing computer(s) 108 may be notified. In some cases, a rejection may result in a data transfer transferring $80 from user B to user A automatically. This may be accomplished by another data transfer, or the original data transfer information may be deleted from the electronic record. In either case, the user A may be notified of the rejection.

In at least one embodiment, user C may accept the transfer at 742. Accordingly, either/both the devices of user B and/or user C, or the data processing computer(s) 108 may record the transfer (e.g., $80 from B to C). In such examples, user B may effectively act as an intermediary between user A and user B such that user A is able to transfer data to user C without first creating a channel with user C.

In at least one embodiment, If user B rejects the data transfer request made by user A to transfer data to user C, or if the threshold limit of user B has been/would be exceeded, then at 744 a routing table may be consulted to determine one or more other paths available to make such a transfer. In at least one example, each channel participant may broadcast its participation in any channel to other channel participants. For example, user B's device may broadcast to user A that user B has a channel with user C, user D (not depicted) and user E (not depicted). In at least one example, data processing computer(s) 108 may transmit such information to each user device utilizing the many electronic records it maintains for each channel. A routing table (or other container) may be maintained at the user's device or at the data processing computer(s) 108. In some examples, such channel participation information may be ascertained from already created records rather than from a separate routing table. In any case, another path between user A and user C may be ascertained at 746. For example, it may be the case that user A has a channel with user F and user F has a channel with user C. Accordingly, at 748, user A may be provided an option to seek a transfer to user C through user F in a similar manner as discussed above. In some cases, it may be determined at 750 that no other path exists for a transfer between user A and user C. In these cases, the data transfer may be declined and user A may be notified.

In at least one embodiment, user A may initiate a close channel procedure at 754. For example, user's A device may transmit a transfer channel request message to the user B's device or the data processing computer(s) 108. The transfer channel request message may be digitally signed. In at least one example, because user B was the recipient of at least one data transfer (e.g., $50 and $80), user B may be required to approve the request to close the channel or initiate a close channel request individually. The close channel request from user B may be transmitted in either a transfer channel request message or a transfer channel response message, as appropriate. In at least one example, the transfer channel request/response message initiated by user B may be digitally signed.

In at least one embodiment, upon receiving indication that both user's agree to close the channel (or in some cases receiving indication to close the channel from the only recipient of any data transfer), a net transfer value may be calculated, formatted according to a blockchain format, and transmitted to the blockchain provider computer(s) 104 in order to be recorded in a ledger. The net transfer value may be an aggregate value of all of the data transfers recorded in the electronic record associated with user A and user B. In the example depicted, the net transfer value would be $100 from user A to user B. In a similar manner, user B and user C may agree to close their channel. Accordingly, a net transfer value may be calculated and a single data transfer (e.g., $20 from user B to user C) may be transmitted to the blockchain provider computer(s) 104 in order to update a ledger. Accordingly, the ledger maintained by the blockchain provider computer(s) 104 may indicate, after all of the transactions in FIG. 7 have been conducted, that user A has $100, user B $1080, and user C $820.

As a non-limiting example, consider that user A is a casino patron, user B is a casino owner, and user C is a vendor associated with the casino (e.g., a food vendor operating within the casino). User A (the patron) and user B (the owner) may conduct one or more transactions via a transfer channel associated with user A and user B. For example, a patron, utilizing an application operating on his smartphone, may request a channel with the casino. The patron may indicating that he wants to transact with the casino, but he does not want to spend over $200. The request may be received and approved utilizing a device operated by the casino owner. A channel may be opened (e.g., an electronic record associated with the patron and the casino is created by a data processing computer) and the $200 threshold limit may be associated with the channel and/or the patron (e.g., as an association between $200 and user A that is maintained within the electronic record). The patron may perform various transactions with the casino. Each of these transactions may be recorded within the electronic record (e.g., by the data processing computer).

Continuing on with the example, it may also be the case that the casino (user B) and the vendor (user C) have a previously-existing channel used to record transactions between them. For example, the vendor may utilize the channel to provide funds to the casino for leasing a space within the casino. The patron may decide that he wishes to purchase a meal from the vendor. In some embodiments, rather than transacting directly with the vendor, the patron may request to provide funds to the vendor via the casino. In this manner, the patron may utilize a trusted relationship (e.g., the channel between the patron and the casino) rather than having to directly transact with a party (e.g., the vendor) with which the patron may have little experience or trust.

The patron may decide at some point that he is finished making purchases and may utilize the application to request that the channel be closed. A transfer amount (e.g., a net purchase amount) may be determined from the purchase transactions recorded in the electronic record and a single transaction may be provided to a blockchain provider to be recorded in a ledger maintained by a block chain provider.

As another non-limiting example, user A may be an online role-playing gamer and user B may be a role-playing game provider. The gamer may request (e.g., via an application operating on his computer) a transfer channel with the game provider. The gamer may indicate a threshold limit that he does not want to exceed with respect to transactions performed between the gamer and the game provider. In at least some examples, upon establishing an electronic record associated with the gamer and/or the game provider in the manner described above, the gamer may proceed with making in-game purchases that will be recorded as a transaction within the electronic record. The gamer may decide at some point that he is finished making purchases and may utilize the application to request that the channel be closed. A transfer amount (e.g., net purchase amount) may be determined from the purchase transactions recorded in the electronic record and a single transaction may be provided to a blockchain provider to be recorded in a ledger maintained by the block chain provider.

It should be appreciated that the systems and methods described herein may be used in any number of contexts or environments including video gaming, eCommerce,

TECHNICAL BENEFITS

Embodiments of the present invention reduce the computational burden of blockchain providers by delegating transaction aggregation to other entities (e.g., data processing computers and/or user devices). Embodiments of the invention ensure that data transfers occurring between parties conform to threshold limits recorded at the blockchain but do not require that every data transfer is reported to the blockchain. By utilizing the techniques described herein, confidentiality of sensitive data is maintained and the integrity of a message may be verified. Accordingly, the computational burden of a blockchain provider may be reduced since it is only required to process a single data transfer (e.g., recording a net transfer value) for each channel that can contain any number of data transfers.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

ADDITIONAL EMBODIMENTS

Another embodiment of the invention is directed to a method performed by a user device. The method comprises facilitating, by a first user device, an exchange of a plurality of data transfer messages between a first application of a first user device and a second application of a second user device. In at least one embodiment, each of the plurality of data transfer messages are digitally signed. The method further comprises maintaining, by the first user device, an electronic record associated with a first user of the first electronic device and a second user of the second electronic device according to the exchange. The method further comprises determining, by first user device, a net transfer value for the electronic record. The method further comprises transmitting, by the first user device, data comprising the net transfer value to a block chain provider. In at least one embodiment, receipt of the data by the blockchain provider may cause the blockchain provider to update a ledger with the net transfer value.

What is claimed is:

1. A computer-implemented method, comprising:
managing, by a data processing computer communicatively coupled to a blockchain provider computer, a data transfer channel for conducting one or more data transfers between a first user of a first electronic device and a second user of a second electronic device;
transmitting, to the blockchain provider computer, a token request message to obtain a token corresponding to the first electronic device, the token representing a threshold limit that a combined transfer value of corresponding data transfers initiated by the first electronic device is limited;
receiving, from the blockchain provider computer, a token response message comprising the token, receipt of the token indicating that a currency amount corresponding to the threshold limit that the token represents has been reserved for use by the first electronic device in the data transfer channel;
facilitating, by the data processing computer, an exchange of the one or more data transfers between the first user of the first electronic device and the second user of the second electronic device, wherein facilitating comprises acting as an intermediary device by forwarding messages between the first electronic device and the second electronic device; and
transmitting, by the data processing computer, data comprising a net transfer value to the blockchain provider computer, the net transfer value being determined based on aggregating corresponding data fields of the one or more data transfers conducted using the data transfer channel, wherein receipt of the data by the blockchain provider computer causes the blockchain provider computer to update a ledger with the net transfer value.

2. The computer-implemented method of claim 1, wherein the data transfer channel is associated with a second threshold limit for which a combined data transfer amount for a subset of the one or more data transfers that are initiated by the first electronic device is limited.

3. The computer-implemented method of claim 2, wherein facilitating the exchange of the one or more data transfers enforcing the threshold limit with respect to the one or more data transfers that are initiated by the first electronic device.

4. The computer-implemented method of claim 2, wherein the data transfer channel is associated with a third threshold limit for which a second combined data transfer amount for a second subset of the one or more data transfers that are initiated by the second electronic device is limited.

5. The computer-implemented method of claim 1, further comprising:
receiving, by the data processing computer, an open channel request message from the first electronic device;
transmitting, by the data processing computer, the open channel request message to the second electronic device; and
receiving, by the data processing computer from the second electronic device, an open channel response message, wherein the data transfer channel is established in response to receiving the open channel response message.

6. The computer-implemented method of claim 1, further comprising:
generating, by the data processing computer, a first asymmetric key pair for the first electronic device;
transmitting, by the data processing computer, the first asymmetric key pair to the first electronic device, the first asymmetric key pair enabling the first electronic device to digitally sign messages originating from the first electronic device;
generating, by the data processing computer, a second asymmetric key pair for the second electronic device; and
transmitting, by the data processing computer, the second asymmetric key pair to the second electronic device, the second asymmetric key pair enabling the second electronic device to digitally sign messages originating from the second electronic device.

7. The computer-implemented method of claim 1, further comprising receiving, by the data processing computer, a close channel request message, the close channel request message being initiated by at least one of the first electronic device or the second electronic device, wherein the net transfer value is transmitted in response to receiving the close channel request message.

8. The computer-implemented method of claim 1, further comprising:
determining, based at least in part on the token, that performing a particular data transfer would cause a combined amount of the corresponding data transfers initiated by the first electronic device to exceed the threshold limit that the token represents; and
rejecting the particular data transfer in response to the determination.

9. The computer-implemented method of claim 1, further comprising receiving an acceptance message indicating a particular data transfer was accepted by a recipient device, wherein the particular data transfer is aggregated to calculate the net transfer value based at least in part on the acceptance message being received.

10. A data processing computer communicatively coupled to a blockchain provider computer, the data processing computer comprising:

one or more processors; and
one or more memories storing computer-executable instructions that, when executed by the one or more processors, causes the data processing computer to:
  manage a data transfer channel for conducting one or more data transfers between a first user of a first electronic device and a second user of a second electronic device;
  transmit, to the blockchain provider computer, a token request message to obtain a token corresponding to the first electronic device, the token representing a threshold limit that a combined transfer value of corresponding data transfers initiated by the first electronic device is limited;
  receive, from the blockchain provider computer, a token response message comprising the token, receipt of the token indicating that a currency amount corresponding to the threshold limit that the token represents has been reserved for use by the first electronic device in the data transfer channel;
  facilitate an exchange of the one or more data transfers between the first user of the first electronic device and the second user of the second electronic device, wherein facilitating comprises acting as an intermediary device by forwarding messages between the first electronic device and the second electronic device; and
  transmit, to the blockchain provider computer, data comprising a net transfer value, the net transfer value being determined based on aggregating corresponding data fields of the one or more data transfers conducted using the data transfer channel, wherein receipt of the data by the blockchain provider computer causes the blockchain provider computer to update a ledger with the net transfer value.

11. The data processing computer of claim 10, wherein the data processing computer is distinct from the blockchain provider computer.

12. The data processing computer of claim 10, wherein executing the computer-executable instructions further causes the data processing computer to provide, to the first electronic device, information identifying a set of related devices associated with the second electronic device, wherein providing the information to the first electronic device enables the first electronic device to conduct a subsequent data transfer with a third electronic device of the set of related devices.

13. The data processing computer of claim 10, wherein executing the computer-executable instructions further causes the data processing computer to:
  receive, from the first electronic device, an open channel request message;
  generate, in response to receiving the open channel request message from the first electronic device, a first asymmetric key pair for the first electronic device; and
  provide, to the first electronic device, the first asymmetric key pair, the first asymmetric key pair enabling the first electronic device to digitally sign messages originating from the first electronic device.

14. The data processing computer of claim 13, wherein executing the computer-executable instructions further causes the data processing computer to:
  receive, from the second electronic device, an open channel response message;
  in response to receiving the open channel response message from the second electronic device, generate a second asymmetric key pair for the second electronic device; and
  provide, to the second electronic device, the second asymmetric key pair, the second asymmetric key pair enabling the first electronic device to digitally sign messages originating from the second electronic device.

15. The data processing computer of claim 10, wherein the blockchain provider computer is not in receipt of the one or more data transfers.

16. The data processing computer of claim 10, wherein the data processing computer manages a plurality of data transfer channels for conducting the one or more data transfers between a respective pair of electronic devices.

17. The data processing computer of claim 10, wherein executing the computer-executable instructions further causes the data processing computer to:
  manage a second data transfer channel for conducting additional data transfers between the second user of the second electronic device and a third user of a third electronic device;
  facilitate the exchange of the additional data transfers between the second user of the second electronic device and the third user of the third electronic device, wherein facilitating comprises acting as the intermediary device by forwarding messages between the second electronic device and the third electronic device; and
  transmit, to the blockchain provider computer, additional data comprising a second net transfer value, the second net transfer value being determined based on aggregating the respective data fields of the additional data transfers conducted using the second data transfer channel, wherein receipt of the additional data by the blockchain provider computer causes the blockchain provider computer to update the ledger with the second net transfer value.

18. The data processing computer of claim 17, wherein executing the computer-executable instructions further causes the data processing computer to:
  receive a request to conduct a first data transfer associated with the first electronic device and the third electronic device;
  transmit a first data transfer message to the second electronic device;
  transmit a second data transfer message to the third electronic device;
  transmit, to the blockchain provider computer, third data comprising the net transfer value of the data transfer channel and the second net transfer value of the second data transfer channel, wherein receipt of the third data by the blockchain provider computer causes the blockchain provider computer to update the ledger with the net transfer value and the second net transfer value.

19. The data processing computer of claim 10, wherein executing the computer-executable instructions further causes the data processing computer to enforce one or more data transfer limits corresponding to the data transfer channel the one or more data transfer limits comprising the threshold limit that the token represents.

* * * * *